(12) United States Patent
Krajewski et al.

(10) Patent No.: US 12,436,025 B2
(45) Date of Patent: Oct. 7, 2025

(54) MULTI-STAGE STRUCTURE-BORNE SOUND AND VIBRATION SENSOR

(71) Applicant: Harman International Industries, Incorporated, Stamford, CT (US)

(72) Inventors: Darin Krajewski, White Lake, MI (US); Yu Du, Chicago, IL (US); Péter Atilla Kardos, Budapest (HU); Flórián Czinege, Budapest (HU)

(73) Assignee: Harman International Industries, Incorporated, Stamford, CT (US)

( * ) Notice: Subject to any disclaimer, the term of this patent is extended or adjusted under 35 U.S.C. 154(b) by 221 days.

(21) Appl. No.: 18/227,533

(22) Filed: Jul. 28, 2023

(65) Prior Publication Data

US 2023/0366727 A1  Nov. 16, 2023

Related U.S. Application Data

(63) Continuation-in-part of application No. 17/332,492, filed on May 27, 2021, now Pat. No. 11,743,656.

(51) Int. Cl.
*G01H 11/08* (2006.01)
(52) U.S. Cl.
CPC .................... *G01H 11/08* (2013.01)
(58) Field of Classification Search
CPC ...... H04R 17/00; H04R 17/02; H04R 17/005; H04R 17/025; H04R 17/10; H04R 2201/401; H04R 2201/405; H04R 2201/40; H04R 2201/403; H04R 2217/00; H04R 7/06; H04R 7/16; H04R 1/08; H04R 19/04; H01L 41/00; H01L 41/053; H01L 41/08; H01L 41/1132

USPC .............. 381/114, 173, 190, 396, 174
See application file for complete search history.

(56) References Cited

U.S. PATENT DOCUMENTS

| 4,254,354 A | 3/1981 | Keem |
| 4,371,804 A | 2/1983 | Peng et al. |
| 4,885,781 A | 12/1989 | Seidel |
| 7,149,318 B2 | 12/2006 | Bank et al. |
| 7,378,776 B2 | 5/2008 | Lu |

(Continued)

FOREIGN PATENT DOCUMENTS

| DE | 102005008515 A1 | 8/2006 |
| FR | 915877 A | 11/1946 |
| WO | 0154450 A2 | 7/2001 |

OTHER PUBLICATIONS

First Office Action for European Application No. 22174375.0 filed May 19, 2022, dated Mar. 13, 2024, 6 pgs.

(Continued)

*Primary Examiner* — Antim G Shah
*Assistant Examiner* — Sabrina Diaz
(74) *Attorney, Agent, or Firm* — Brooks Kushman P.C.

(57) ABSTRACT

In at least one embodiment, a multi-stage sound and vibration sensor is provided. The multi-stage sound and vibration sensor includes a housing, a first piezo-diaphragm and a second piezo diaphragm. The first piezo-diaphragm and the second piezo-diaphragm are positioned in the housing to detect an input signal including audio or vibrations. The first piezo-diaphragm and the second piezo-diaphragm provide a first resonance frequency and a second resonance frequency in response to detecting the audio or the vibrations.

16 Claims, 10 Drawing Sheets

(56) References Cited

U.S. PATENT DOCUMENTS

| | | | |
|---|---|---|---|
| 2007/0245804 A1* | 10/2007 | Yoshida | G01H 11/08 |
| | | | 73/35.09 |
| 2014/0010374 A1* | 1/2014 | Kasai | H04R 3/00 |
| | | | 381/26 |
| 2019/0378968 A1 | 12/2019 | Fukui et al. | |
| 2020/0189641 A1 | 6/2020 | Katsuyama et al. | |

OTHER PUBLICATIONS

Extended European Search Report mailed Sep. 30, 2022 for European Application No. 22174375.0, 9 pgs.
Extended European Search Report mailed Oct. 18, 2022 for European Application No. 22174379.2, 7 pgs.
Non-Final Office Action; related U.S. Appl. No. 17/332,488, filed May 27, 2021; date of mailing Apr. 11, 2022; 15 pgs.
First Office Action for European Application No. 22174379.2 filed May 19, 2022, dated Jan. 31, 2025, 4 pgs.

\* cited by examiner

MULTI-STAGE STRUCTURE-BORNE SOUND AND VIBRATION SENSOR

CROSS-REFERENCE TO RELATED APPLICATIONS

This application is a continuation in part of U.S. patent application Ser. No. 17/332,492 filed May 27, 2021, the disclosure of which is hereby incorporated in its entirety by reference herein.

TECHNICAL FIELD

Aspects disclosed herein generally provide for a multi-stage sound and vibration sensor. For example, the multi-stage sound and vibration sensor may include a plurality of piezo-diaphragm based sensing elements (or piezo-diaphragms) that is also suitable to pick up structure-borne sound and vibration that provides high bandwidth and high sensitivity. This aspect and others will be discussed in more detail below.

BACKGROUND

Piezo-diaphragms or piezoelectric diaphragms are piezoelectric ceramic disks adhered to a metal plate that is typically formed of brass or nickel alloy. A common piezoelectric ceramic material is lead zirconate titanate (PZT). Due to the piezoelectric effect presented by the piezoelectric ceramic disk that converts electrical signals (e.g., voltage, charge) into mechanical signals (e.g., deformation, strain, etc.) and vice versa, piezo-diaphragms are widely used as transducer elements. One typical application of a piezo-diaphragm is a sound buzzer device that converts electrical input energy into mechanical deformation of the piezo-diaphragm, resulting in sound emission. On the other hand, when a piezo-diaphragm is attached to a base structure, the piezo-diaphragm can vibrate once excited by mechanical motion of the base structure and generate a charge or voltage output, thus forming a vibration sensor. If the mechanical motion of the base structure is induced by sound, the piezo-diaphragm in this case becomes essentially a sound sensor that is equivalent to a microphone.

SUMMARY

In at least one embodiment, a multi-stage sound and vibration sensor is provided. The multi-stage sound and vibration sensor includes a housing, a first piezo-diaphragm and a second piezo diaphragm. The first piezo-diaphragm and the second piezo-diaphragm are positioned in the housing to detect an input signal including audio or vibrations. The first piezo-diaphragm and the second piezo-diaphragm provide a first resonance frequency and a second resonance frequency in response to detecting the audio or the vibrations.

In at least one embodiment, a multi-stage sound and vibration sensor is provided. The multi-stage sound and vibration sensor includes a housing, a first piezo-diaphragm and a second piezo diaphragm. The first piezo-diaphragm and the second piezo-diaphragm positioned in the housing detect an input signal including audio or vibrations. The first piezo-diaphragm and the second piezo-diaphragm provide a first resonance frequency and a second resonance frequency in response to the input signal in which the first resonance frequency is different than the second resonance frequency.

In at least one embodiment, a multi-stage sound and vibration sensor is provided. The multi-stage sound and vibration sensor includes a housing, a first piezo-diaphragm and a second piezo diaphragm. The first piezo-diaphragm and the second piezo-diaphragm positioned in the housing detect an input signal including audio or vibrations. The piezo-diaphragm and the flexible support plate form a two degree of freedom (DOF) system that enables the sensor to exhibit a frequency response at two resonant frequencies in response to the input signal.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
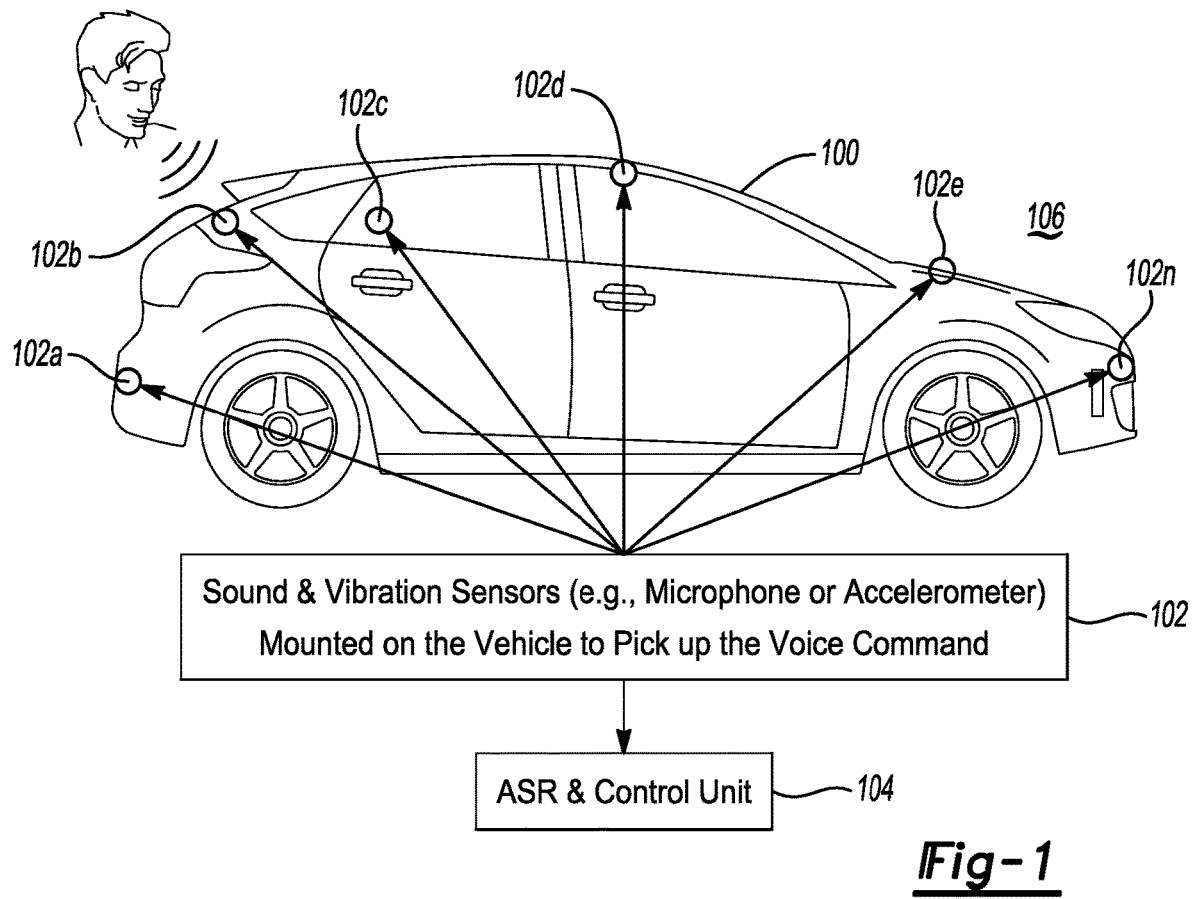
FIG. 1 depicts a vehicle including a plurality of sound and vibration sensors.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Aspects disclosed herein generally relate to a piezo-diaphragm based sensor in which a piezo-diaphragm has a flexible bottom surface mounted thereon to provide a second resonance in a frequency band of interest. This implementation provides a one mechanism to extend a signal bandwidth for the sensor. In another aspect, a plurality of piezo-diaphragms may be provided to generate a plurality of resonances in the frequency band of interest. This aspect provides an active way to extend the signal bandwidth for the sensor.

Piezo-diaphragms or piezoelectric diaphragms are piezo-electric ceramic disks adhered to metal plate of, for example, brass or nickel-alloy. A common piezoelectric piezo-electric ceramic is lead zirconate titanate (PZT). Due to the piezo-electric effect presented by the piezoelectric ceramic disk that converts electrical signals (e.g., voltage, charge) into mechanical signals (e.g., deformation, strain) and vice versa, piezo-diaphragms are widely used as transducer elements. One application of piezo-diaphragms is the sound buzzer device that converts electrical input energy into mechanical deformation of the piezo-diaphragm, resulting in sound emission. On the other hand, when a piezo-diaphragm is attached to a base structure, the piezo-diaphragm can vibrate once excited by mechanical motion of the base structure and generate a charge or voltage output, thus forming a vibration sensor. If the mechanical motion of the base structure is induced by sound, the piezo-diaphragm in this case becomes a sound sensor equivalent to a microphone.

The piezo-diaphragm based sensor includes a printed circuit board (PCB) assembly ("PCBA") and a piezo-diaphragm enclosed in a protective housing. The protective housing includes an upper body and a bottom surface. The PCB assembly with appropriate electrical components serves as a pre-amplifier or signal conditioner for the piezo-diaphragm output and is fixed to the housing body through adhesive or other mechanical mechanisms. Similarly, the piezo-diaphragm may be attached to the bottom surface of the protective housing through adhesive or other mechanical mechanisms. The piezo-diaphragm and the PCBA are interconnected by a pair of electrical wires for power and signal transmitting. When the piezo-diaphragm sensor is attached to a base surface such as a vehicle body (e.g., windshield glass, body panel or bumper), the sensor may sense motions of the base surface through piezoelectric effect of the piezo-diaphragm, whether the motion is induced by vibration sources (e.g., road roughness, engine, etc.) or acoustic sources in the environment (e.g., voice). In the latter case, the piezo-diaphragm sensor functions as a surface-mounted microphone.

The signal bandwidth for the disclosed piezo-diaphragm based sensor may be controlled by the property of the piezo-diaphragm and the manner in which the piezo-diaphragm is mounted inside the housing. Piezo-diaphragms may come with a natural vibration mode or natural resonance frequency residing between 2 kHz and 5 kHz. Below this resonance frequency, the sensor sensitivity is essentially flat which is characterized as a useful bandwidth of the sensor. Above the resonance frequency, the sensitivity may drop rapidly. When the sensor is used as a surface mounted microphone, a bandwidth up to 2 kHz-5 kHz may be relatively narrow compared to the typical audio bandwidth of 20 Hz to 20 kHz. To increase the signal bandwidth, the bottom surface of the housing to which the piezo-diaphragm is attached can be implemented to provide a second resonance at a higher frequency than the existing resonance. The second resonance helps to boost the sensitivity at high frequencies to increase the signal bandwidth. To fit various application needs, the location of the second resonance may be implemented with the following parameters: bottom surface shape, thickness, size, material and location at which the piezo-diaphragm is attached to the bottom surface. The overall implementation of the bottom surface provides at least one innovative aspect.

The piezo-diaphragm sensor may include the PCBA and the piezo-diaphragm enclosed in the protective housing. The sensor may include a flexible bottom surface implementation that generates a second resonance to aid in extending the signal bandwidth of the sensor. The flexible bottom surface generally includes a bottom surface shape, predetermined thickness, predetermined size, and predetermined material and the location at which the piezo-diaphragm is attached to the bottom surface. For example, considering a circular piezo-diaphragm and housing design, mounting the piezo-diaphragm concentrically with the bottom surface at a center point versus along the rim may result in different resonance locations and frequency response characteristics.

The embodiments disclosed herein may provide a response for recent applications in connection with, for example, automotive Original Equipment Manufacturers (OEMs) that may need a surface-mountable microphone for external voice activity detection. The disclosed piezo-diaphragm sensor relates to sensing audio signals inside or outside of the vehicle. As such, the sensor should include sufficient sound sensing bandwidth. For external vehicle applications, the sensor should also be environmentally robust and insensitive to wind noise. The sensor may be sensitive to voice induced structural vibrations in the case of the surface-mounted vibration sensor. Other microphone (or sensor) applications may benefit from the aspects disclosed herein. For example, microphones that are traditionally difficult to position in the vehicle such as spaces like a full glass rooftop versus a traditional headliner and for sound and vibration sensing for active noise cancellation (ANC)/road noise cancellation (RNC), vehicle noise compensation (VNC), and external siren detection may utilize any one or more of the sensors disclosed herein.

Some acoustic microphones may have acceptable bandwidth and sensitivity, but such microphones may be difficult to be packaged in a way that can resist water/dust contamination. Accelerometers, on the other hand, may be environmentally robust and may be implemented in a sealed package and can pick up vibrations caused by voice and transmitted through structures. The disclosed microphones (or piezo-diaphragm sensors) may be implemented as surface mounted microphones that may be environmentally robust as well.

In general, existing lab level precision accelerometers may serve as microphones to detect external audio. However, such accelerometers may be too expensive to be used for automotive implementations. In addition to lab level precision accelerometers, commercial, off the shelf Micro-Electro-Mechanical System (MEMS) accelerometers typically have a limited bandwidth (e.g., up to 4 kHz) or low sensitivity compared to what is needed in terms of an ideal bandwidth for audio applications. In general, external voice detection in the automotive industry is gaining interest by OEMs with a desired objective of developing sensor solutions that can meet environmental robustness, signal bandwidth, higher sensitivity, packaging constraints and low cost. The sensor solutions disclosed herein may meet such OEM objectives.

FIG. 1 depicts a vehicle 100 including a plurality of sound and vibration sensors 102a-102n ("102") for detecting sound that is external to the vehicle 100. The plurality of sound and vibration sensors 102 may include microphones or accelerometers (or a combination thereof). The plurality of sound and vibration sensors 102 are distributed about the vehicle 100 and are configured to detect voice commands that are external (or internal) to the vehicle 100. A controller 104 is positioned in the vehicle 100 and receives signals from the various sound and vibration sensors 102.

OEMs generally desire that the plurality of sound and vibration sensors 102 may be implemented as surface-mountable sensors for external (or internal) voice detection. Thus, the plurality of sound and vibration sensors 102 may transmit signals indicative of detected voice commands to the controller 104. The controller 104 may then activate or deactivate a predetermined vehicle operation (e.g., open/close a trunk, vehicle door, liftgate, etc.) in response to the voice commands. Given that the plurality of sound and vibration sensors 102 is configured to detect voice audio from an environment exterior 106 to the vehicle 100, the sensors 102 may be positioned on external portion of the vehicle 100 and may be exposed to a variety of environmental factors. As such, the sensors 102 need to be environmentally robust and insensitive to, for example, wind. Additionally, the sensors 102 need to provide a sufficient wideband for voice sensing and remain sensitive enough to voice induced structural vibrations in the case of a surface-mounted vibration sensor. This piezo-diaphragm based sensor 102 measures the vibration (i.e., acceleration) of the base structure surface on which the sensor 102 is attached to, regardless the source of the vibration. In the case, where the structure vibration is excited by sound, the sensor 102 then picks up the sound signal and functions as a traditional microphone. Furthermore, whether the sound corresponds to voice commands or background noise, the sensor 102 may be one way to use the sensed signal. In case of speech detection, the sensor 102 may be used in connection with voice command applications. In case of background noise, the sensor 102 may detect signals that can be used in the ANC/RNC system.

Figure 2:
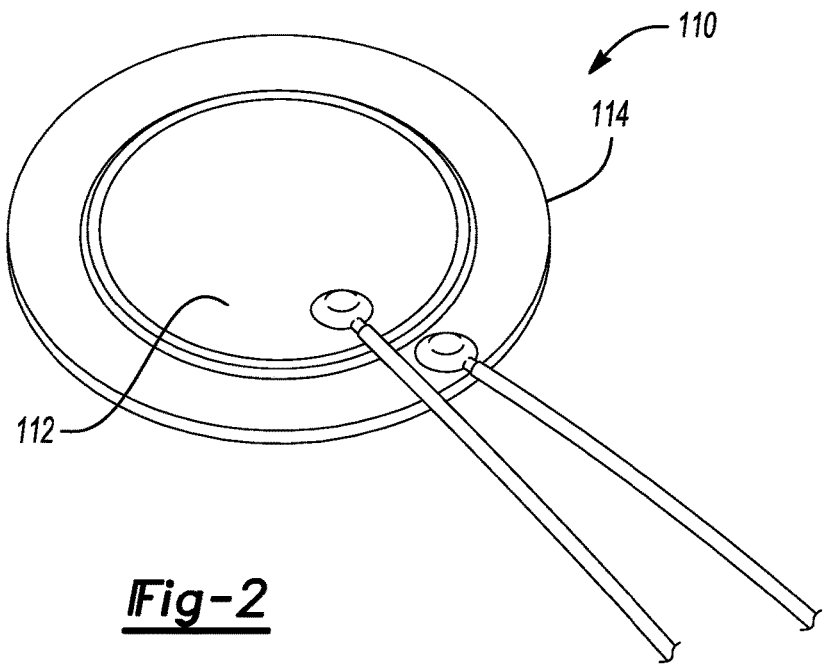
FIG. 2 depicts an example of a piezo-diaphragm.

FIG. 2 depicts an example of a piezo-diaphragm 110. The piezo-diaphragm 110 may be a piezoelectric diaphragm that includes a ceramic disk 112 and a metal substrate plate 114. The ceramic disk 112 may be adhered to the metal substrate plate 114 which may be formed of brass (or nickel alloy). The material for the ceramic disk 112 may be lead zirconate titanate (PZT). The piezoelectric effect presented by the piezoelectric ceramic disk converts electrical signals (e.g., a voltage or charge) into mechanical signals (e.g., deformation, strain, etc.) and vice versa. Piezo-diaphragms may be used as sensing or actuating elements for a transducer. One typical application of a piezo-diaphragms is that of a sound buzzer that converts electrical input energy into mechanical deformation of the piezo-diaphragm resulting in a sound emission.

When the piezo-diaphragm 110 is attached to a base structure (not shown), the piezo-diaphragm can vibrate once excited by the mechanical motion of the base structure and generate a charge or voltage output, thus forming a vibration sensor. If the mechanical motion of the base structure is induced by sound, the piezo diaphragm 110 becomes a sound sensor equivalent to a microphone.

Figure 3:
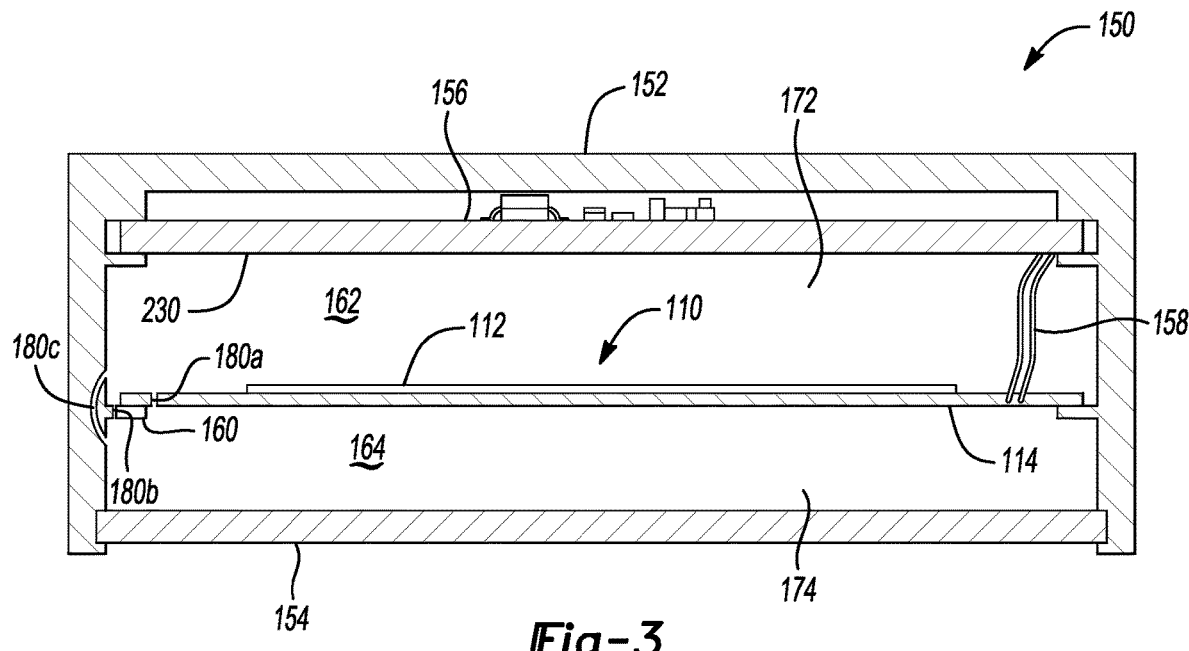
FIG. 3 depicts an example of a single piezo-diaphragm based sound and vibration sensor.

FIG. 3 depicts an example of a piezo-diaphragm based sound and vibration sensor 150 in accordance with one embodiment. The sensor 150 includes the piezo-diaphragm 110 (see FIG. 2), a housing 152, and a bottom cover or (lid) 154. The piezo-diaphragm 110 may be supported circumferentially along an edge of the substrate plate 114 within the housing 152. A bottom cover or lid 154 is positioned below the piezo-diaphragm 110 and is also attached to the housing 152 circumferentially. The housing 152 and lid 154 encapsulate the piezo-diaphragm 110. It is recognized that the lid 154 may or may not be implemented. If implemented, the lid 154 may be merely used for environmental protection A printed circuit board (PCB) assembly 156 (or PCBA 156) is coupled to the piezo-diaphragm 110 via a pair of electrical wires 158 to transmit a signal indicative of detected sound (or audio) external (or internal) to the vehicle 100 to at least one integrated circuit (or microprocessor) (not shown) positioned on a substrate 230 of the PCBA assembly 156. The microprocessor may process the signal and transmit another signal to a controller (e.g., the controller 104).

The signal bandwidth for the sensor 150 is generally determined based on a resonance frequency of the piezo-diaphragm 110 itself which is typically limited to an upper frequency of 2-5 kHz. Such a bandwidth may be too narrow for a speech or sound system when compared to a typical audio bandwidth of 20 Hz-20 kHz that is audible to human ears. In general, a frequency range of 20 Hz-20 kHz is an acoustic signal bandwidth that is audible to human ears. Thus, an ideal acoustic sensor should be sensitive and maintain the same sensitivity (e.g., flat frequency response) across the entire audible band.

The sensor 150 maintains the flat frequency response region up to the natural resonance frequency of the piezo-diaphragm which is typically between 2 kHz and 5 kHz (e.g., depending on the properties of the piezo-diaphragm design and manufacturing). Above its resonance frequency, the sensitivity reduces rapidly with increasing frequency (e.g., the sensor 150 still picks up signal, but it is not as sensitive). In comparison with the entire audible range, a frequency band of 2 k-5 k Hz is relatively narrow. A wideband speech application generally requires a bandwidth at least up to 7 kHz. Therefore, generating a second resonance in the frequency band of interest through the use of a flexible bottom plate (see below flexible bottom plate 202) may increase the bandwidth of the sensor.

The sensor 150 may be optimized to mitigate a static pressure difference for a volume air positioned on one side of the piezo-diaphragm 110 and for another volume of air positioned on another side of the piezo-diaphragm. For example, and as generally shown in FIG. 3, the sensor 150 generally includes a ledge 160 that extends from an inner wall of the housing 152. The ledge 160 receives the substrate plate 114 and fixes the substrate plate 114 thereto. Thus, in this regard, the substrate plate 114 and the ledge 160 define a first volume of air 162 positioned on a first side 172 of the sensor 150 and a second volume of air 164 positioned on a second side 174 of the sensor 150. It is recognized that the ledge 160 may be integrated with the housing 152 and may be formed of a similar material. Therefore, the housing 152 includes the ledge 160. Generally, when the first volume of air 162 is sealed off from the second volume of air 164 and due to a temperature difference, a difference in static pressure may be formed between the first volume of air 162 and the second volume of air 164 and applied to the piezo-diaphragm 110. The difference in static pressure between the first side 172 and the second side 174 may apply undesired acoustical/mechanical loads to both sides of the piezo-diaphragm 110. To mitigate the static pressure difference, the sensor 150 may be arranged to include any number of channels 180a-180c ("180") to ventilate the volume of air between the first side 172 and the second side 174.

The number of channels 180 employed in the sensor 150 may vary based on the desired criterion of a particular implementation. In one example, the substrate plate 114 may define any number of channels 180a therethrough to create a ventilation effect between the volume of air between the first side 172 and the second side 174. While FIG. 3 generally illustrates a single channel 180a positioned on the substrate plate 114 It is recognized that any number of channels 180a may be dispersed throughout the substrate plate 114. In another example, the ledge 160 may define the channel 180b to create the ventilation between the volume of air on the first side 172 and on the second side 174. It is recognized that the any number of channels 180b may be positioned anywhere along the ledge 160. While FIG. 3 generally illustrates that the ledge 160 includes a single channel 180b, it is recognized that any number of channels 180b may be positioned on the ledge 160. In yet another example, the housing 152 may define the channel 180c positioned therein with any one or more of its corresponding walls that form the housing 152. In this regard, the channel 180c as embedded in therein may create ventilation between the volume of air on the first side 172 and on the second side 174 and reduce the pressure differential between the first side 172 and the second side 174.

Single Piezo-Diaphragm Based Sound and Vibration Sensor

The single piezo-diaphragm based sound and vibration sensor is based, among other things, on a single piezo-diaphragm that mounted on a flexible bottom plate. A second resonance associated with the bottom plate will work together with the natural resonance of the piezo-diaphragm itself to expand the overall signal bandwidth of the sensor.

Figure 4:
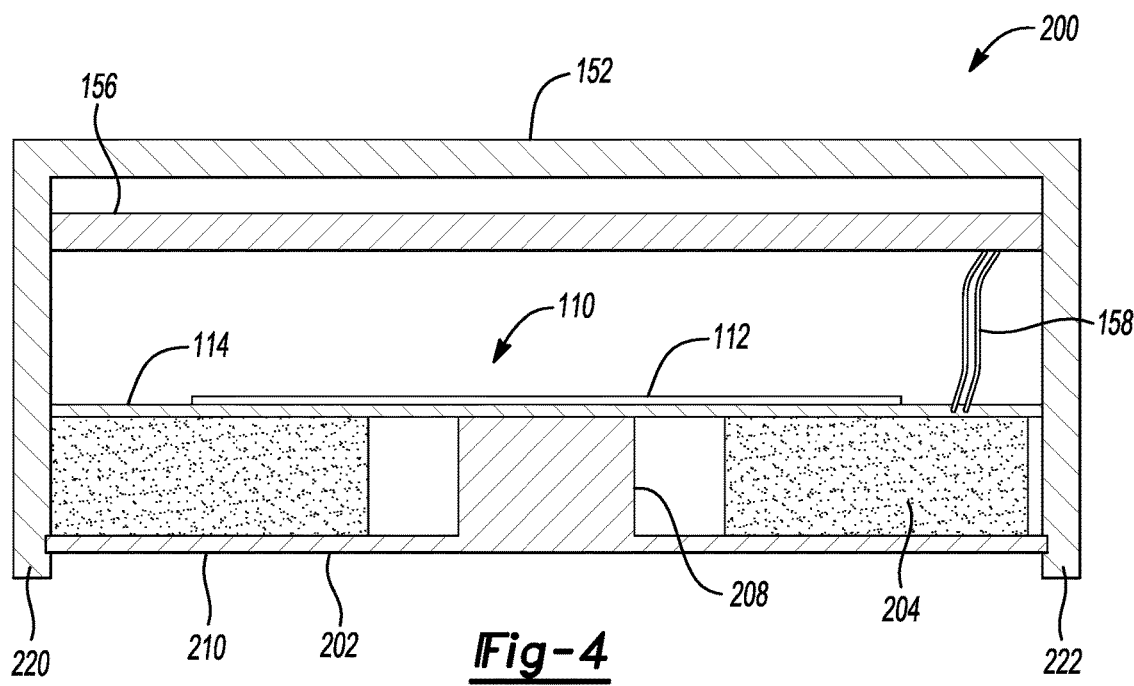
FIG. 4 depicts a cross-sectional view of a single piezo-diaphragm based structure-borne sound and vibration sensor in accordance to one embodiment.

FIG. 4 depicts a cross-sectional view of a single piezo-diaphragm based sound and vibration sensor 200 in accordance to one embodiment. The sensor 200 includes the piezo-diaphragm 110 and the housing 152. The sensor 200 may include a first plate 202 (e.g., support plate or bottom plate 202). The bottom plate 202 is flexible and includes a post 208 (or mounting post 208) that extends above the bottom plate and an extending portion 210. It is recognized that the post 208 may be flexible or rigid. In the event, the post 208 is rigid, the post 208 may be packaged as a separate component from the extending portion 210 which remains flexible. The extending portion 210 is substantially flat and is axially displaced from the piezo-diaphragm 110. The extending portion 210 is flexible and vibrates which generates a second resonance which aids in the overall sensor output. In conventional designs, the bottom portion of the housing or a lid coupled to the housing are rigid by default or are irrelevant to the acoustical performance of the sensor.

The bottom plate 202 supports the piezo-diaphragm 110 via the mounting post 208. The extending portion 210 of the flexible bottom plate 202 may have a uniform thickness and is connected circumferentially to an inner wall of the housing 152. The extending portion 210 environmentally seals the housing 152. An optional damping mechanism 204 (e.g. a layer of damping material such as, for example, memory foam) surrounds the mounting post 208. The damping mechanism 204 may be positioned below the piezo-diaphragm 110. The flexible bottom plate 202 connects to the housing 152 circumferentially at ends of 220 and 222 of the housing 152. The bottom plate 202 may be positioned directly adjacent to the damping mechanism 204 and covers the damping mechanism 204. Thus, the damping mechanism 204 is positioned between the bottom plate 202 and the piezo-diaphragm 110. When implemented, the damping mechanism 204 may help dampen the vibration response amplitudes of the piezo-diaphragm 110 at resonant frequencies, and thus maintain a flat and smooth amplitude frequency response in a bandwidth as wide as possible.

The bottom plate 202 is compressible and are engineered (or tuned) to provide a second resonance at high frequencies. For example, the mass and stiffness properties of the mounting post 208 and the flat portion 210 are engineered and provided to generate a second resonance in a frequency response of the sensor 200. The second resonance may be achievable since the piezo-diaphragm 110 and the bottom plate 202 upon which the piezo-diaphragm 110 is mounted form a two degree-of-freedom (DOF) system that provides two resonances.

The manner in which the piezo-diaphragm 110 and the bottom plate 202 form a two degree-of-freedom (DOF) system that provides two resonances will be described in more detail. For example, while still referring to FIG. 4, in theory and considering the transverse vibration of the piezo-diaphragm 110 in the vertical direction (e.g., perpendicular to the surface of the piezo-diaphragm 110), the piezo-diaphragm 110 can be modeled as a lumped mass supported on a spring. The allowed vibration motion of the lumped mass is the translational displacement along the axis of the spring (i.e., the direction perpendicular to the surface of the piezo-diaphragm 110). Thus, this spring-mass system is termed as a one-degree-of-freedom (1DOF) system. The 1DOF spring-mass system has a mechanical resonance frequency determined by and is proportional to the square root of the ratio of its spring stiffness to its mass. Similarly, the flexible bottom plate 202 can be modeled as a second 1DOF spring-mass system that comes with its own mechanical resonance frequency. When the piezo-diaphragm 110 is positioned (i.e., stacked) on top of the flexible bottom plate 202 as depicted in FIG. 4, the two 1DOF systems are combined to become a two DOF (2DOF) system that provides two mechanical resonance frequencies.

It is recognized that the two resonance frequencies of the combined 2DOF system may not have exactly the same values as those in the two individual 1DOF systems. However, the two resonance frequencies of the combined 2DOF system can be implemented to be close enough to the two resonance frequencies of the two individual 1DOF systems or implemented to have otherwise desired values. For example, the first resonance frequency in the 2DOF system may be designed to be close to the resonance frequency of the piezo-diaphragm 110 when considered as a 1DOF system (i.e., decoupled from the flexible bottom plate 202). Likewise, the second resonance frequency in the 2DOF system may be designed to be higher than the first resonance frequency and close to the resonance frequency of the flexible bottom plate 202 when considered as a 1DOF system (i.e., decoupled from the piezo-diaphragm 110). Due to the generation of the $2^{nd}$ resonance frequency by using the flexible bottom plate 202, the sensor output becomes more sensitive at high frequencies compared to the case of only using the 1DOF system formed by the piezo-diaphragm 110 (e.g., the conventional design depicted in FIG. 3). Therefore, by providing the second higher resonance, the sensor 200 can extend the signal bandwidth to higher frequency regions that may not have been achieved with prior implementations. This aspect will be discussed further in connection with FIG. 7.

Figure 5:
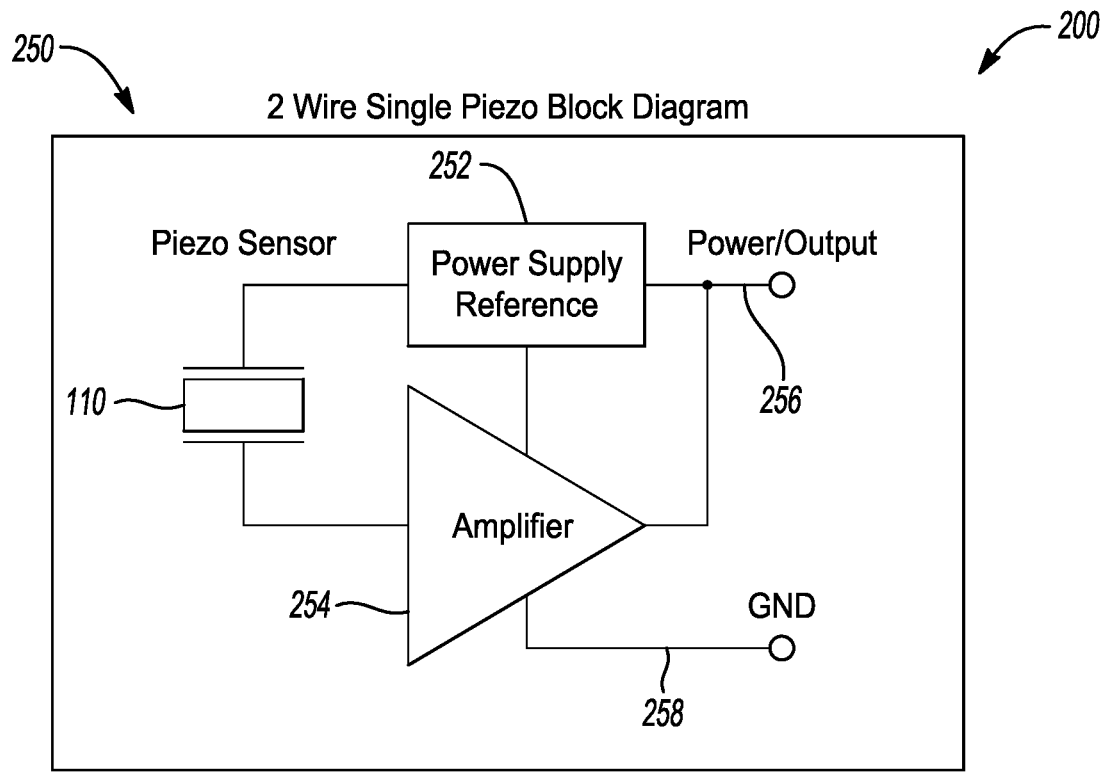
FIG. 5 depicts a first block diagram of a single piezo-diaphragm based structure-borne sound and vibration sensor with a two-wire electrical interface.

FIG. 5 depicts a first block diagram 250 of a two-wire electrical interface circuit of the sensor 200 that is based on a single piezo-diaphragm 110 in accordance to one embodiment. The first block diagram 250 generally represents a circuit design that may be used in two-wire VDA applications. The sensor 200 includes the piezo diaphragm 110, a power supply reference circuit (or power supply) 252, and an amplifier circuit 254. The amplifier circuit 254 and the power supply 252 share a common terminal 256 (e.g., first wire).

In general, a reference voltage is provided from a power source that is external to the sensor to the power supply 252 via the terminal 256. The power supply 252 provides the reference voltage to the piezo-diaphragm 110 (e.g., the sensing element) and the amplifier circuit 254. The amplifier circuit 254 amplifies the signal detected by the piezo-diaphragm 110 and provides an amplified output on the output terminal 256 which is then provided external to the sensor 200.

A ground connection 258 (e.g., second wire) is provided for the sensor 200. The power supply 252 receives power from an external regulated voltage source (e.g., vehicle head unit or amplifier) through connection 256 and provides a reference voltage to the piezo-diaphragm 110 and the amplifier circuit 254. The piezo-diaphragm 110 provides a signal to the amplifier 254. The signal corresponds to a detected audio input that is external (or internal) to the vehicle 100. The amplifier circuit 254 applies signal conditioning (e.g., amplification and filtering) to the signal and outputs to connection 256. It is recognized that the power supply reference 252 and the amplifier circuit 254 may be positioned on an integrated circuit (or microprocessor) that is positioned on the PCBA 156 of the sensor 200.

Figure 6:
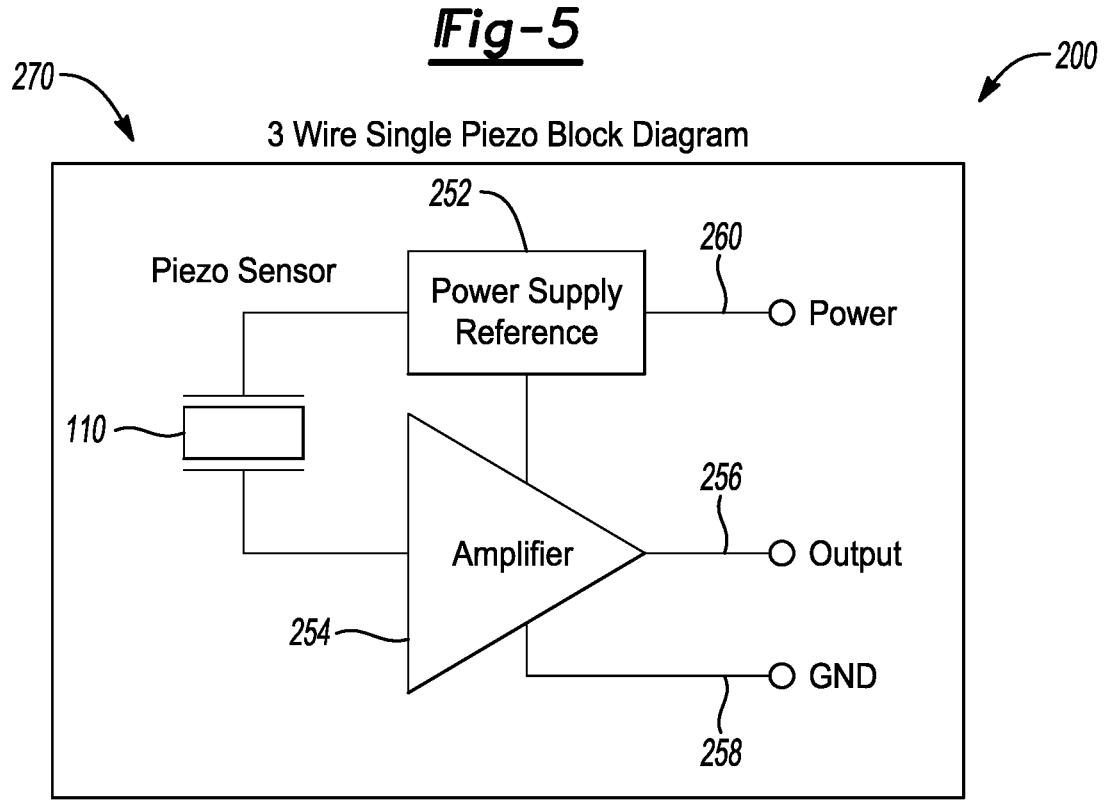
FIG. 6 depicts a second block diagram of a single piezo-diaphragm based structure-borne sound and vibration sensor with a three-wire electrical interface.

FIG. 6 depicts a second block diagram 270 of a three-wire electrical interface circuit of the sensor 200 that is based on a single piezo-diaphragm 110 in accordance to one embodiment. The sensor 200 includes the piezo-diaphragm 110, the power supply 252, and the amplifier circuit 254. The operation of the circuit in the second block diagram 270 is similar to the operation of the circuit in the first block diagram 250. The amplifier circuit 254 provides an electrical output on the first output 256 (e.g., first wire). The ground connection 258 (e.g., second wire) is provided to the sensor 200. The power supply 252 receives power from an external regulated voltage source (e.g., vehicle head unit or amplifier) through connection 260 (or terminal, wire, etc. hence third wire) and provides a reference voltage to the piezo-diaphragm 110 and the amplifier circuit 254. The difference between the first block diagram 250 and the second block diagram 270 is that the power input terminal and the signal output terminal in the first block diagram 250 are shared at the same connection 256, while all three interface wires are separate in the second block diagram 270.

Figure 7:
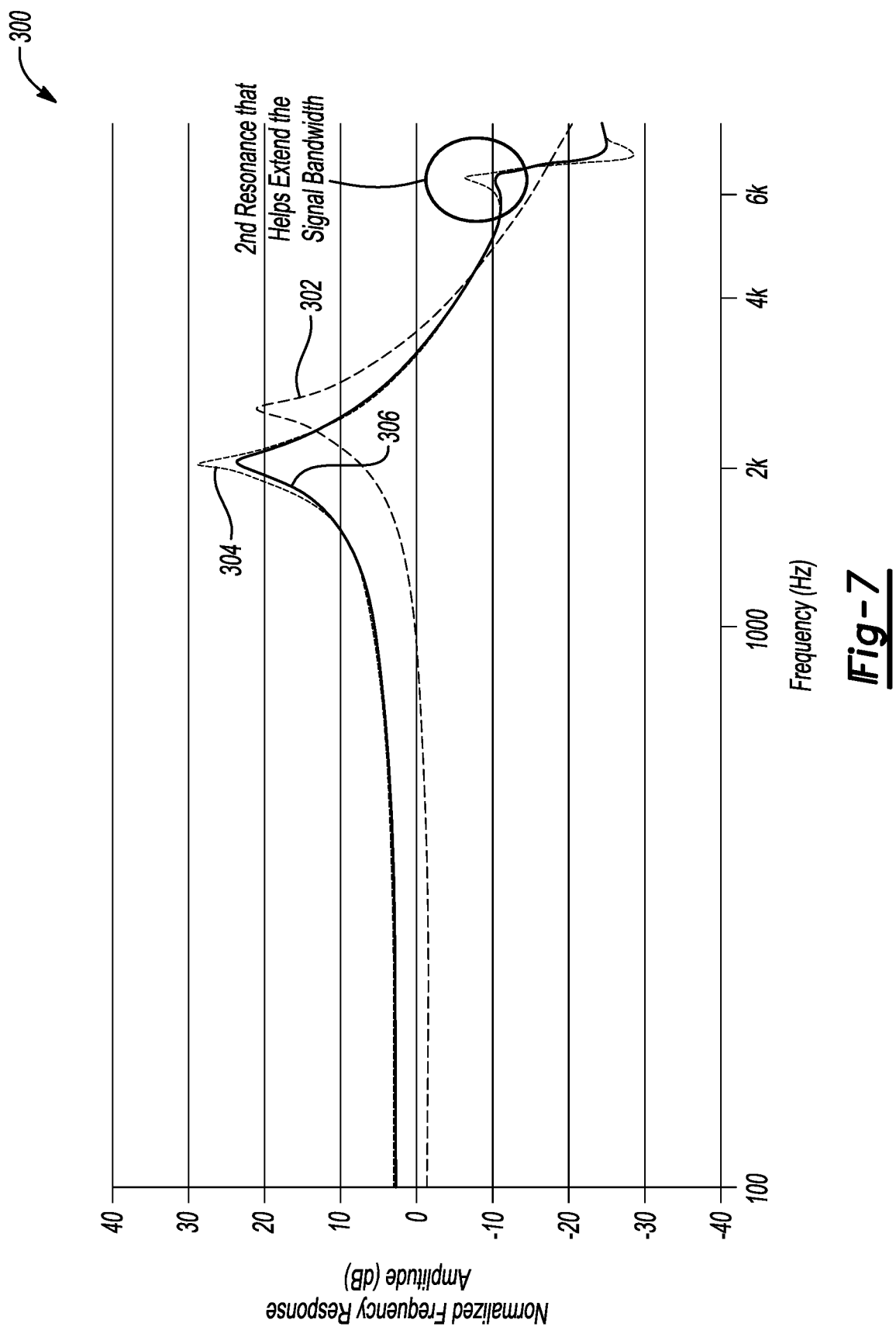
FIG. 7 depicts a simulated frequency response of the single piezo-diaphragm based structure-borne sound and vibration sensor in accordance to one embodiment.

FIG. 7 is a plot 300 illustrating simulated frequency responses for a conventional piezo-diaphragm sensor and for the single piezo-diaphragm sensor 200 in accordance to one embodiment. For example, waveform 302 depicts the simulated frequency response for the conventional piezo-diaphragm sensor. As shown, the waveform 302 illustrates that a single resonance is generated somewhere between 2 kHz and 3 kHz corresponding to the spring-mass properties of the piezo-diaphragm 110. Below the resonance frequency, the amplitude response of the sensor is fundamentally flat over the frequency range. At higher frequencies above the resonance frequency of the waveform 302, e.g., >4 kHz, the amplitude response is substantially lower than that in the flat portion. This makes the conventional piezo-diaphragm sensor insensitive to high frequency signals, thus limiting its bandwidth.

Waveform 304 depicts the simulated frequency response for the single piezo-diaphragm sensor 200 in accordance to one embodiment illustrated in FIG. 4. As shown, waveform 304 provides a first resonance at roughly 2 kHz and a second resonance at roughly 6 kHz. Below the first resonance, the amplitude response of the sensor depicted by the waveform 304 is fundamentally flat over the frequency range. Above the first resonance, although the amplitude response reduces with increasing frequency, the amplitude response is boosted again by the second resonance around 6 kHz. It can be seen that the second resonance makes the amplitude response noticeably higher than that of the waveform 302. Therefore, the second resonance provided by the sensor 200 extends the signal bandwidth such that audible voice commands may be better detected either external to the vehicle 100 (or internal within the vehicle 100). As the frequency contents above 2 kHz is advantageous to speech intelligibility, the single piezo-diaphragm sensor 200 is more advantageous than the conventional piezo-diaphragm sensor in voice commend applications. Waveform 306 shows the frequency response for the case depicted by waveform 304 but with the damping mechanism 204 as illustrated in FIG. 4. It is demonstrated that, when a damping mechanism 204 is added, the response amplitudes at resonance peaks are attenuated, therefore resulting in a smoother frequency response shape.

As shown, the flexible bottom plate 202 enables the sensor 200, 200', 200", and 200''' to generate a second resonance in the frequency response of the sensor 200, 200', 200", and 200''' at a frequency region of interest to the application (e.g., within an audible band) as illustrated in the waveform 304. Due to inherent multiple resonances in the frequency response of the sensor 200, 200', 200", or 200''' for a certain sound and vibration input, the output of the sensor 200, 200', 200", or 200''' at the frequencies of interest to the application may be more sensitive than conventional designs that only have one resonance in the frequency response.

Figure 8:
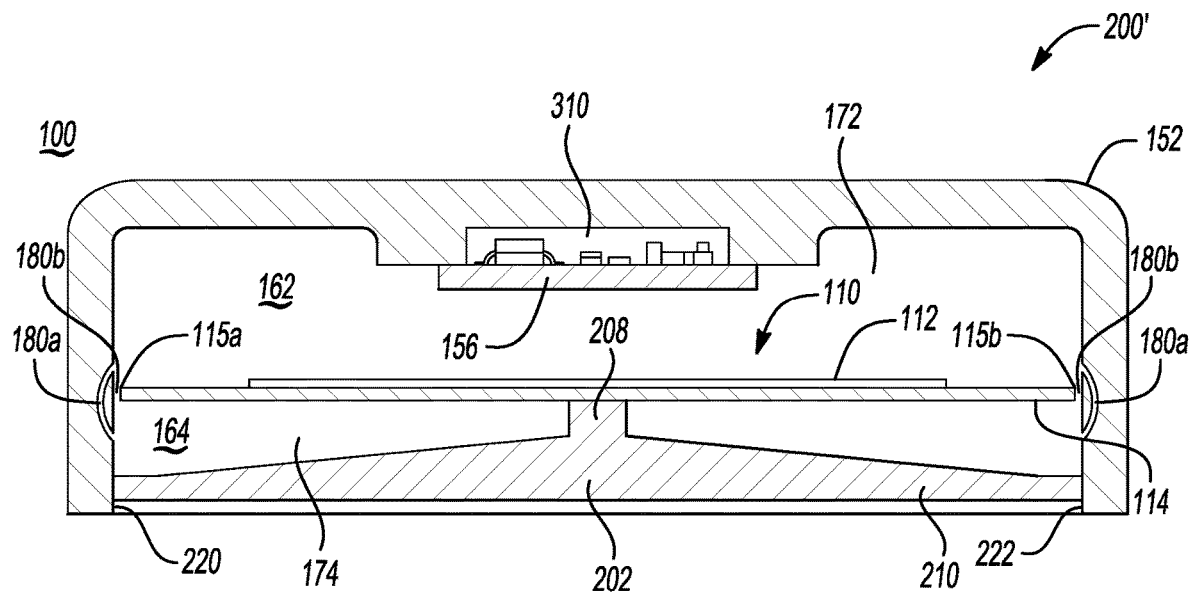
FIG. 8 depicts a cross-sectional view of another single piezo-diaphragm based sound and vibration sensor in accordance to one embodiment.

FIG. 8 depicts a cross-sectional view of another single piezo-diaphragm based sound and vibration sensor 200' in accordance to one embodiment. The sensor 200' includes the piezo-diaphragm 110 and the housing 152. As noted above, the piezo-diaphragm 110 may be positioned on the bottom plate 202 (or flexible bottom plate 202). Similarly, the sensor 200' includes the PCBA 156 that is coupled to the piezo-diaphragm 110 via the at least one pair of electrical wires (not shown) to transmit a signal indicative of detected sound external (or internal) to the vehicle 100 to at least one integrated circuit (or microprocessor) (not shown) and/or other electronics positioned on the PCBA assembly 156. The housing 152 defines a cavity 310 for receiving the PCBA 156 including the microprocessor and/or the electronics positions thereon. By inserting the PCBA 156 into the cavity 310 and coupling it thereto, this may reduce the overall packaging height of the sensor 200' which may be advantageous for packaging the sensor 200 in various locations in the vehicle 100. The microprocessor may process the signal and transmit another signal to a controller (e.g., the controller 104) located somewhere in the vehicle 100.

The sensor 200' also includes the bottom plate 202 (or flexible bottom plate 202) having the post 208 and the extending portion 210. As shown, the extending portion 210 has a variable thickness as the extending portion 210 extends between the ends 220 and 222. The piezo-diaphragm 110 is mounted on a top surface of the post 208 of the flexible bottom plate 202 through adhesive or other mechanical mechanism. While not shown, it is recognized that the sound and vibration sensor 200' may optionally include the damping mechanism 204 that surrounds at least the post 208 of the flexible bottom plate 202. The damping mechanism 204 may be positioned in between and in contact with the piezo-diaphragm 110 and the extending portion 210 of the flexible bottom plate 202. The flexible bottom plate 202 is connected to the housing 152 circumferentially along the ends 220 and 222 and may optionally form an environmental seal to an inner volume defined by an interior of the housing 152. The extending portion 210 of the bottom plate 202 has a thickness that varies between a center point (or center area) thereof and its circumference. It is recognized that the thickness of the extending portion 210 of the flexible bottom plate 202 may increase from the end 220 and the second end 222 to the center area of the post 208 or that the thickness of the extending portion 210 of the bottom plate 202 may decrease from the ends 220, 222 to the center area of the post 208. As noted above, it is desirable to achieve or provide a second resonance at a proper frequency location to expand the signal bandwidth of the sensor 200'. The second resonance frequency may be determined by the mass and stiffness values of the spring-mass system formed by the flexible bottom plate 202. Varying the thickness provides one approach to adjust the mass and stiffness values of the flexible bottom plate 202 to result in a proper secondary resonance frequency.

Similar to the sensor 150 as discussed in connection with FIG. 3, the sensor 200' also includes channels 180*a* and/or 180*b*. The channels 180*a* and/or 180*b* may reduce or eliminate the pressure differential of the volume of air 162, 164 located on the first side 172 and the second side 144, respectively, of the sensor 200'. As noted above, the channel 180*a* and/or 180*b* may create ventilation between the volume of air 162, 164 on the first side 172 and on the second side 174, respectively, and reduce the pressure differential between the first side 172 and the second side 174 of the sensor 200'. In general, at least one outer end 115*a* and/or 115*b* of the substrate plate 114 and at least one of the walls of the housing 152 define or form the channel 180*a* and/or 180*b*. It is recognized that the number of channels 180 formed in the sensor 200 may vary based on the desired criteria of a particular implementation.

Figure 9:
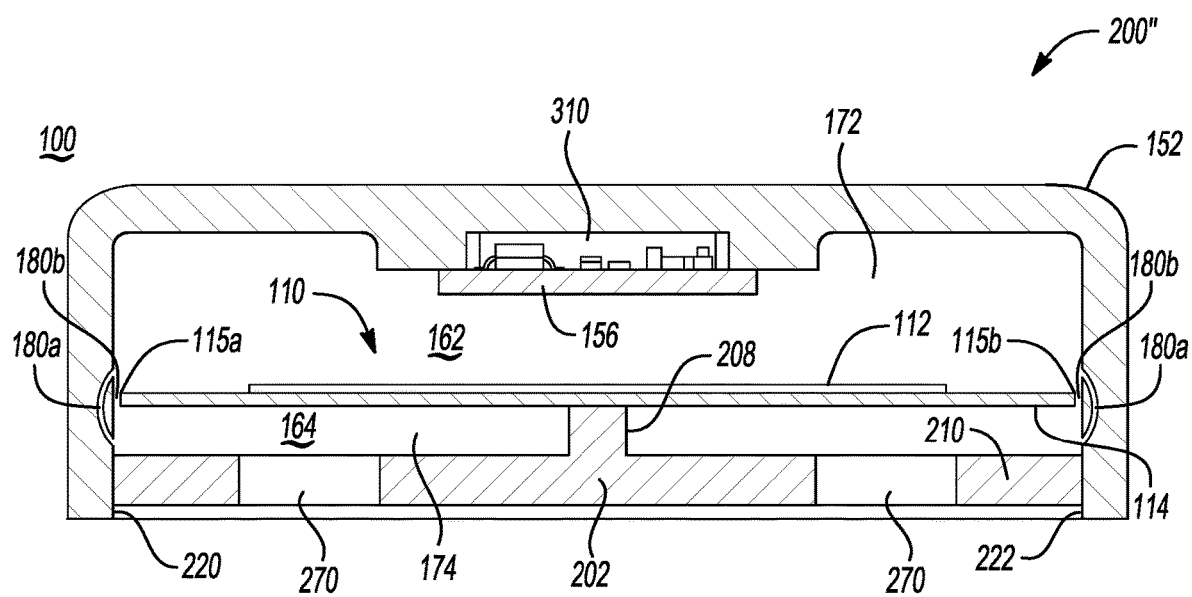
FIG. 9 depicts a cross-sectional view of another single piezo-diaphragm based sound and vibration sensor in accordance to one embodiment.

FIG. 9 depicts a cross-sectional view of a another single piezo-diaphragm based sound and vibration sensor 200" in accordance to one embodiment. The sensor 200" includes the piezo-diaphragm 110 and the housing 152. The piezo-diaphragm 110 may be positioned on the bottom plate 202 (or the flexible bottom plate 202). Similarly, the sensor 200" includes the PCBA 156 that is coupled to the piezo-diaphragm 110 via the at least one pair of electrical wires (not shown) to transmit a signal indicative of detected sound external (or internal) to the vehicle 100 to at least one microprocessor (not shown) and/or other electronics positioned on the PCBA 156. The housing 152 defines a support feature 310 for receiving the PCBA 156 including the microprocessor and/or the electronics positions thereon. The microprocessor may process the signal and transmit another signal to a controller (e.g., the controller 104) in the vehicle 100.

The flexible bottom plate 202 includes the post 208 and the extending portion 210. The piezo-diaphragm 110 is mounted on the top of the post 208 of the flexible bottom plate 202 through adhesive or other mechanical mechanism. While not shown, it is recognized that the sound and vibration sensor 200" may optionally include the damping mechanism 204 that surrounds at least a portion 208 of the post 208 and is positioned between and in contact with the piezo-diaphragm 110 and the extending portion 210 of the flexible bottom plate 202. The flexible bottom plate 202 is connected to the housing 152 circumferentially along the ends 220, 222. The extending portion 210 of the flexible bottom plate 202 may include at least one perforation 270 (or cavity) formed through the entire surface of the extending portion 210. The number of perforations 270 on the mounting post 202 may vary based on the desired criteria of a particular implementation. As noted above, it is desirable to achieve or provide a second resonance at a proper frequency location to expand the signal bandwidth of the sensor 200". The second resonance frequency may be determined by the mass and stiffness values of the spring-mass system formed by the flexible bottom plate 202. The one or more perforations 270 provides another approach to adjust the mass and stiffness values of the flexible bottom plate 202 to result in a proper secondary resonance frequency.

Similar to the sensor 150 as discussed in connection with FIG. 3, the sensor 200" also include channels 180*a* and/or 180*b*. The channels 180*a* and/or 180*b* may reduce or eliminate the pressure differential of the volume of air located on the first side 162 and the second side 164 of the sensor 200". As noted above, the channel 180*a* and/or 180*b* may create ventilation between the volume of air on the first side 172 and on the second side 174 and reduce the pressure differential between the first side 172 and the second side 174 of the sensor 200". In general, at least one outer end 115*a* and/or 115*b* of the substrate plate 114 and at least one of the walls of the housing 152 define or form the channel 180*a* and/or 180*b*. It is recognized that the number of channels 180 formed in the sensor 200" may vary based on the desired criteria of a particular implementation.

Figure 10:
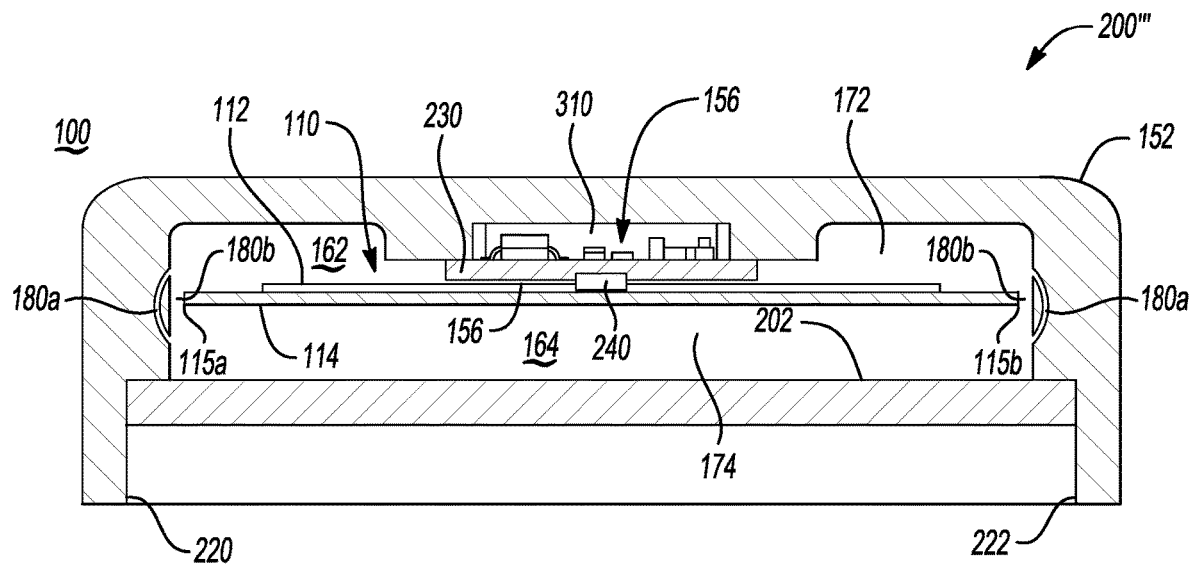
FIG. 10 depicts a cross-sectional view of another single piezo-diaphragm based sound and vibration sensor in accordance to one embodiment.

FIG. 10 depicts a cross-sectional view of a another single piezo-diaphragm based sound and vibration sensor 200' in accordance to one embodiment. The sensor 200''' includes the piezo-diaphragm 110, the PCBA 156 and the housing 152. The PCBA 156 includes the electronics mounted on a substrate board 230 and is secured to the housing 156 through adhesive or other mechanical mechanism. The piezo-diaphragm 110 may be connected to and supported directly by the substrate board 230 of the PCBA 156 through a mounting post 240 (or spacer). Similarly, the sensor 200' includes the PCBA 156 that is coupled to the piezo-diaphragm 110 via the at least one pair of electrical wires (not shown) to transmit a signal indicative of detected sound external (or internal) to the vehicle 100 to at least one integrated circuit (or microprocessor (not shown)) and/or other electronics positioned on the PCBA 156. The cavity 310 of the housing 152 receives the PCBA 156 including the (or the microprocessor) and/or the electronics positions thereon. The microprocessor may process the signal and transmit another signal to a controller (e.g., the controller 104) positioned in the vehicle 100. Similar to the functionality of the bottom plate 202 as set forth in connection with FIGS. 8 and 9, when the first spring-mass system formed by the piezo-diaphragm 110 is directly supported by the substrate board 230 of the PCBA 156, the substrate board 230 may be flexible and form the second spring-mass system to provide the second resonance to the sensor 200'''. The desired value of the second resonance frequency may be achieved by adjusting the size and thickness of the substrate board 230. In the embodiment depicted in FIG. 10, the bottom plate 202 is optional. If provided, the bottom plate 202 serves to environmentally seal the sensor housing 152.

Similar to the sensor 150 as discussed in connection with FIG. 3, the sensor 200''' also include channels 180a and/or 180b. The channels 180a and/or 180b may reduce or eliminate the pressure differential of the volume of air 162, 164 located on the first side 172 and the second side 174, respectively, of the sensor 200'''. As noted above, the channel 180a and/or 180b may create ventilation between the volume of air 162 on the first side 172 and the air 164 on the second side 174 and reduce the pressure differential between the air 162 on the first side 172 and the air 164 on second side 174 of the sensor 200'''. It is recognized that the number of channels 180 may vary based on the desired criteria of a particular implementation. In general, at least one outer end 115a and/or 115b of the substrate plate 114 and at least one of the walls of the housing 152 define or form the channel 180a and/or 180b. It is recognized that the number of channels 180 formed in the sensor 200' may vary based on the desired criteria of a particular implementation.

The embodiments described above are utilized as a single piezo-diaphragm based sound and vibration sensor and are capable of detecting structure-borne sound and vibration signals that is external (or internal) to the vehicle. Such embodiments may be more environmentally robust than conventional acoustical sensors (e.g., acoustical microphones). As noted above, the embodiments also provide a higher bandwidth for improved audio sensing and automatic speech recognition (ASR) accuracy than conventional piezo-diaphragm based sensors. Similarly, the embodiments provide higher sensitivity and higher signal to noise (SNR) ratio compared to conventional off-the-shelf accelerometers and generally provide for a more cost-effective implementation for automotive applications. As also noted above, the embodiments provide an extended bandwidth by adding a second resonance.

Multi-Stage Piezo-Diaphragm Based Sound and Vibration Sensor

Figure 11:
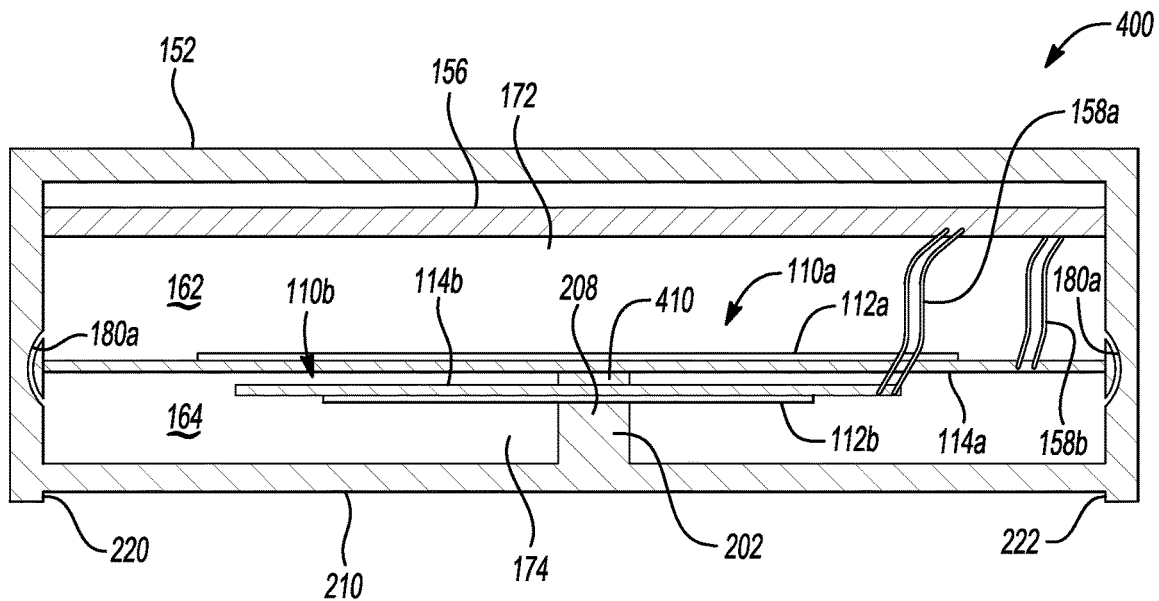
FIG. 11 depicts a cross-sectional view of a multi-stage piezo-diaphragm based sound and vibration sensor in accordance to one embodiment.

FIG. 11 depicts a cross-sectional view of a multi-stage piezo-diaphragm based sound and vibration sensor 400 in accordance to one embodiment. The sensor 400 includes a number of the features disclosed in connection with the single piezo-diaphragm based sensors 200, 200', 200'', and 200'''. The sensor 400 includes a plurality of piezo-diaphragms 110a-110b that are stacked in series and positioned on the bottom plate 202 through the mounting post 208 of the bottom plate 202 The mounting post 208 may be integrated with the bottom plate 202. The bottom plate 202 as referenced in connection with the multi-stage piezo-diaphragms may or may not be flexible. As shown in FIG. 11, the piezo-diaphragm 110b is supported on the mounting post 208 by adhesive or other mechanical mechanism. The piezo-diaphragm 110a is axially spaced apart by the piezo-diaphragm 110b via a spacer 410. In other words, the piezo-diaphragm 110a is parallel to the piezo-diaphragm 110b. The piezo-diaphragms 110a and 110b and the spacer 410 can be connected together using adhesive or other mechanical mechanism.

In another embodiment, a center opening can be formed in the piezo-diaphragms 110a and 110b. The post 208 may be made as a step axle with a thinner diameter at the top portion thereof and a thicker diameter at the bottom portion thereof. The center opening of the piezo-diaphragm 110b is placed and secured over the top thinner diameter of the post 208 via interference fit or adhesive. When assembled, the piezo-diaphragm 110b then sits on the step created by the thicker diameter of the post 208. Then similarly, the spacer 410 may be formed of a step axle that has a thinner diameter at the top portion thereof and a thicker diameter at a bottom portion thereof. The center opening of the piezo-diaphragm 110a is placed and secured over the top thinner diameter of the spacer 410 via interference fit or adhesive.

Each of the piezo-diaphragms 110a-110b may come with different sizes and mechanical properties, therefore different resonance frequencies with the second resonance frequency being higher than the first resonance frequency. Each of the piezo-diaphragms 110a-110b may generate a signal output and when such signals are combined, the combined output signal provides a wider bandwidth and higher sensitivity than a single piezo diaphragm implementation. A first pair of wires 158a couples the piezo-diaphragm 110a to the PCBA 156. A second pairs of wires 158b couples the piezo-diaphragm 110b to the PCBA 156. The post 208 and the extending portion 210 are generally stiff and may not be compressible or flexible as noted in connection with the sensors 200, 200', 200'' noted above. In this manner, the post 208 and/or the extending portion 210 function to support or mount the piezo-diaphragms 110a, 110b inside the housing 152.

Similar to the sensor 150 as discussed in connection with FIG. 3, the sensor 400 also include channel 180a. The channel 180a may reduce or eliminate the pressure differential of the volume of air 162, 164 located on the first side 172 and the second side 174, respectively of the sensor 400. As noted above, the channel 180a may create ventilation for the volume of air 162, 164 on the first side 172 and the second side 174, respectively, and reduce the pressure differential between the air 162 on the first side 172 and the air 164 on second side 174 of the sensor 400. It is recognized that the number of channels 180 may vary based on the desired criteria of a particular implementation.

Figure 12:
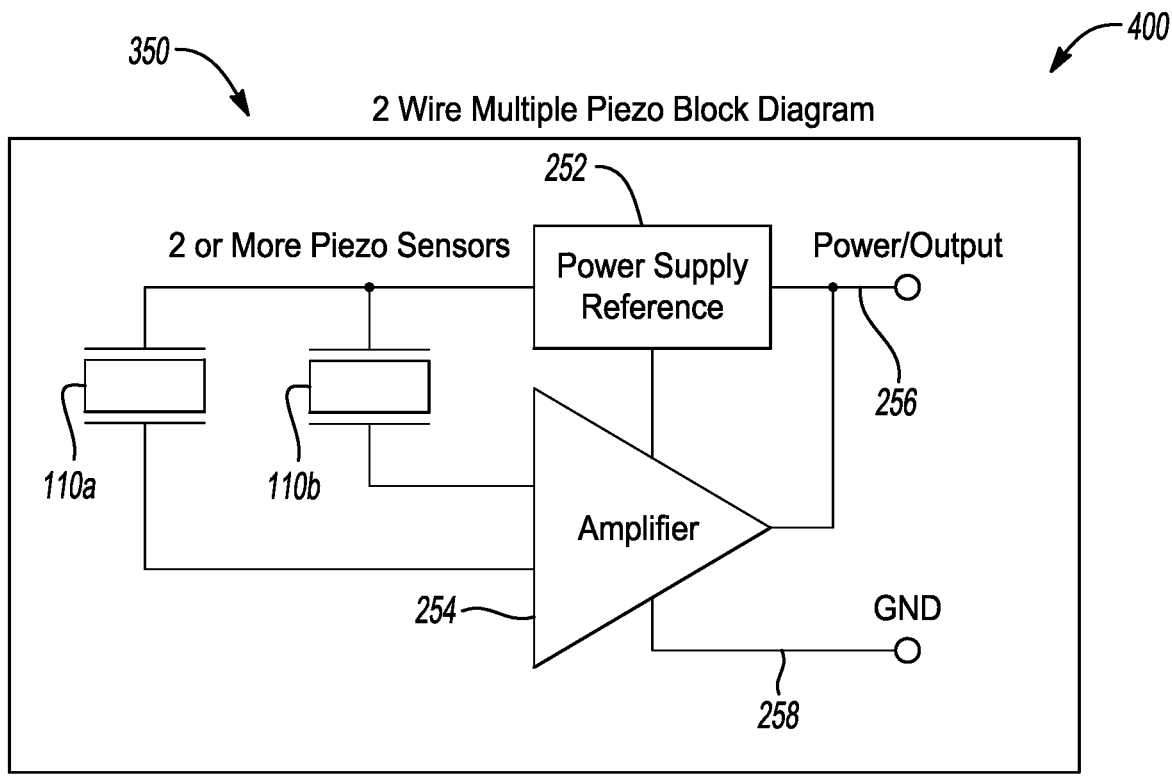
FIG. 12 depicts a first block diagram of a multi-stage piezo-diaphragm based sound and vibration sensor with a two-wire electrical interface.

FIG. 12 depicts a first block diagram 350 of a two-wire electrical interface circuit of the sensor 400 that is based on a multi-stage piezo-diaphragm implementation in accordance to one embodiment. The first block diagram 350 generally represents a circuit design that may be used in connection with a circuit design for a two-wire VDA application. The sensor 400 includes the plurality of piezo diaphragms 110a-110b, the power supply reference circuit (or the power supply) 252, and the amplifier circuit 254. The output or connection 256 (e.g., first wire) is shared between the amplifier circuit 254 and the power supply 252. The ground connection 258 (e.g., second wire) is provided for the sensor 400. The power supply 252 receives power from an external regulated voltage source (e.g., vehicle head unit or amplifier) on the connection 256 and provides a reference voltage to the plurality of piezo diaphragms 110a and 110b and to the amplifier circuit 254. Each of the piezo diaphragms 110a, 110b provides a signal to the amplifier circuit 254. Each of the signals corresponds to a detected audio input that is external (or internal) to the vehicle 100. The amplifier circuit 254 applies signal conditioning (e.g., amplification and filtering) to both of the output signals from the piezo-diaphragms 110a, 110b and electronically adds (or sums) them together and outputs the combined signal to connection 256. Given that the piezo-diaphragms 110a and 110b are provided with distinct electromechanical properties, each piezo-diaphragm 110a and 110b provides a resonance in its frequency response curve. Below this resonance, the response amplitude (e.g., sensitivity) of each piezo-diaphragm 110a, 110b is fundamentally constant (e.g., flat) versus the frequency. This flat frequency response region defines the signal bandwidth of the output of the piezo-diaphragm 110a and 110b. The constant amplitude value may be generally inverse proportional to the resonance frequency value. For illustration and referring to FIG. 11, it is assumed that the piezo-diaphragm 110a provides a first resonance that is lower than the second resonance provided by the piezo-diaphragm 110b. This entails that the piezo-diaphragm 110b has a wider bandwidth and lower sensitivity compared to those of the piezo-diaphragm 110a. When the outputs from the plurality of piezo diaphragms 110a-110b are combined together, the effective sensitivity and bandwidth of the sensor 400 are improved compared to either piezo-diaphragm being used alone. This will be explained further in FIG. 14. In general, the power supply 252 generates a reference voltage that is half of the input voltage it receives from a battery of a car or other controller in the vehicle 200. The power supply 252 provides this input voltage (e.g., half amount of voltage) to the piezo-diaphragms 110a, 110b and the amplifier circuit 254. It is recognized that the power supply 252 and the amplifier circuit 254 may be positioned on an integrated circuit (or microprocessor) that is positioned on the PCBA 156 of the sensor 400.

Figure 13:
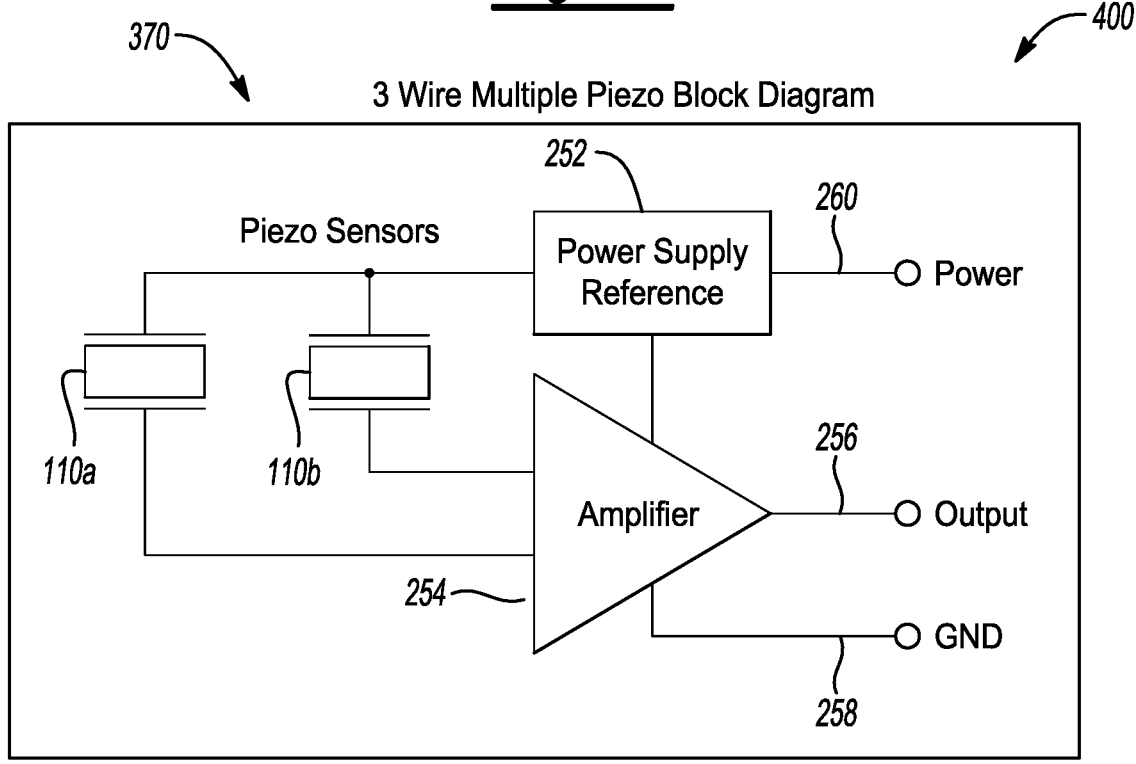
FIG. 13 depicts a second block diagram of a multi-stage piezo-diaphragm based sound and vibration sensor with a three-wire electrical interface.

FIG. 13 depicts a second block diagram 370 of a three-wire electrical interface circuit for the sensor 400 that is based on a multi-stage piezo-diaphragm implementation in accordance to one embodiment. The sensor 400 includes the piezo diaphragms 110a and 110b, the power supply 252, and the amplifier circuit 254. The operation of the circuit in the second block diagram 370 is similar to the operation of the circuit in the first block diagram 350. The amplifier circuit 254 provides an electrical output on the first output 256 (e.g., first wire). The ground connection 258 (e.g., second wire) is provided to the sensor 400. The power supply 252 receives power from an external regulated voltage source (e.g., vehicle head unit or amplifier) through connection 260 (e.g., terminal, wire, etc. hence third wire) and provides the voltage reference to the plurality of piezo diaphragms 110a-110b and the amplifier circuit 254. The difference between the first block diagram 350 and the second block diagram 370 is that the power input terminal and the signal output terminal are shared at the connection 256 in the first block diagram 350, while all three interface wires are separate in the second block diagram 370.

Figure 14:
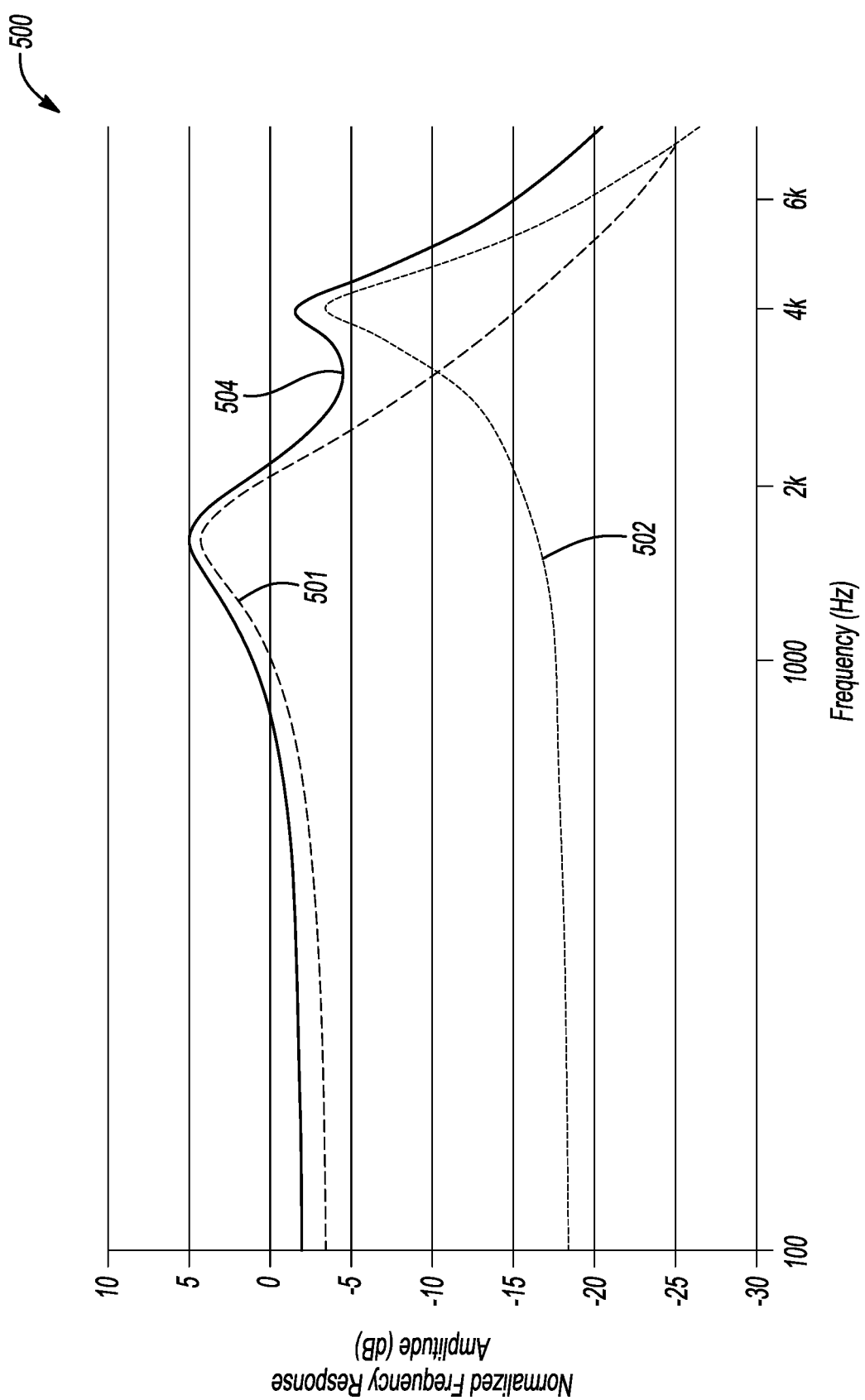
FIG. 14 depicts a simulated frequency response of the multi-stage piezo-diaphragm based sound and vibration sensor in accordance to one embodiment.

FIG. 14 is a plot 500 illustrating simulated frequency responses for a conventional single piezo-diaphragm sensor and for the multi-stage piezo-diaphragm sensor 400 that includes the plurality of piezo diaphragms 110a-110b in accordance to one embodiment. For example, waveforms 501 and 502 depict the simulated frequency responses for the conventional single piezo-diaphragm. As shown, the waveforms 501 and 502 illustrate that a single resonance is generated somewhere between 1.6 kHz and 1.8 kHz (see waveform 501) and around 4 kHz (see waveform 502), respectively. The waveform 502 has a resonance frequency higher than the waveform 501 and presents a much lower sensitivity in the flat response region than that of the waveform 501. Waveform 504 depicts the simulated frequency response for the multi-stage piezo-diaphragm sensor 400, which is an electrical combination of the waveforms 501 and 502. As shown, waveform 504 provides a first resonance at roughly 1.6 kHz to 1.8 kHz and a second resonance at roughly 4 kHz. The second resonance provided by the sensor 400 extends the signal bandwidth and the combination of all signals from the plurality of piezo diaphragms 110a-110b increases the sensitivity. Therefore, the sensor 400 may present significantly improved performance in detecting the structure-borne sound, such as the audible voice commands external (or internal) to the vehicle.

Figure 15:
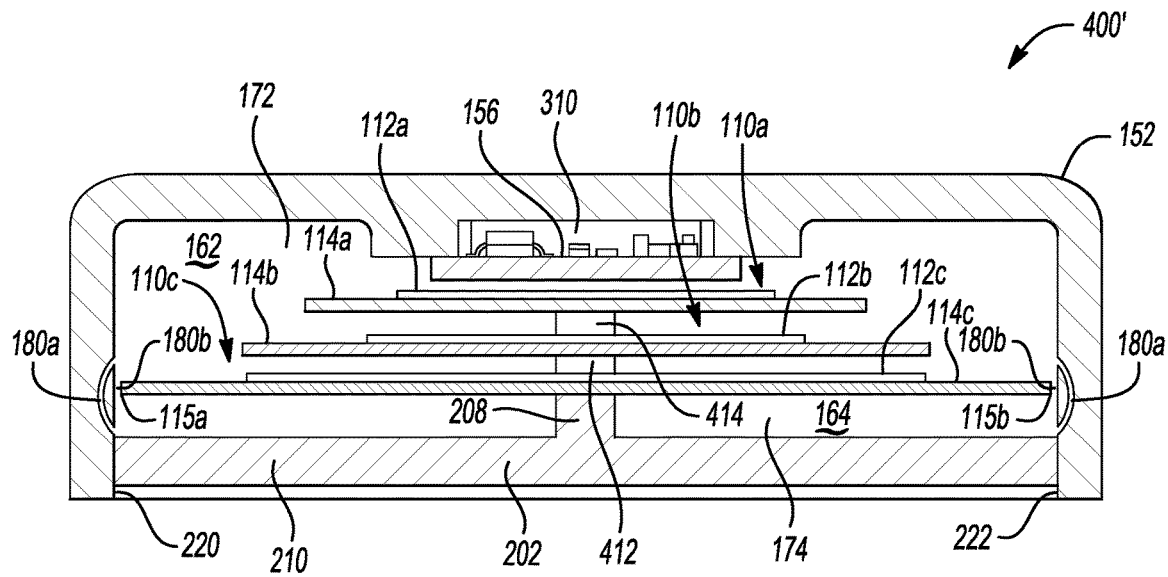
FIG. 15 depicts a cross-sectional view of another multi-stage piezo-diaphragm based sound and vibration sensor in accordance to one embodiment.

FIG. 15 depicts a cross-sectional view of another multi-stage piezo-diaphragm based sound and vibration sensor 400' in accordance to one embodiment. The sensor 400' includes a number of the features disclosed in connection with the multi-stage piezo-diaphragm based sensor 400 and the single piezo-diaphragm based sensors 200, 200', 200", and 200'". The sensor 400' includes a plurality of piezo-diaphragms 110a-110c that are stacked and positioned on the post 208 of the bottom plate 202. Each of the piezo-diaphragms 110a-110c generates an output signal with a distinct resonance frequency and when such signals are electronically combined, the combined output signal provides the wide bandwidth and high sensitivity.

The housing 152 defines the cavity 310 for receiving the PCBA 156 including the microprocessor and/or the electronics positions thereon. The microprocessor may process the signal and transmit another signal to a controller (e.g., the controller 104) that is external (or internal) to the vehicle 100. As shown, the overall sizes (e.g., length or diameter) of each of the piezo diaphragms 110a-110c are different from one another. Since the resonance frequency and sensitivity is closely related with various parameters such as the sizes of each piezo-diaphragm, the differences in sizes of the piezo diaphragms 110a-110c provide respective resonance frequencies with desired values. Therefore, when the outputs from the plurality of the piezo-diaphragms 110a-110c are electronically combined, the sensor 400' will have improved bandwidth and sensitivity compared to each of the piezo-diaphragms 110a-110c being used alone.

The piezo-diaphragm 110a is axially spaced apart by the piezo-diaphragm 110b via a spacer 414. The piezo-diaphragm 110a is parallel to the piezo-diaphragm 110b. The piezo-diaphragms 110a and 110b and the spacer 414 can be connected together using adhesive or other mechanical mechanism. The piezo-diaphragm 110b is axially spaced apart by the piezo-diaphragm 110c via a spacer 412. The piezo-diaphragm 110b is parallel to the piezo-diaphragm 110c. The piezo-diaphragms 110b and 110c and the spacer 414 can be connected together using adhesive or other mechanical mechanism.

In another embodiment, a center opening can be formed in the piezo-diaphragms 110a, 110b, and 110c. The post 208 may be made as a step axle with a thinner diameter at the top portion thereof and a thicker diameter at the bottom portion thereof. The center opening of piezo diaphragm 110c fits (or forms an interference fit) with the top thinner diameter of the post 208. similarly, the spacer 412 may be formed as a step axle with a thinner diameter at a top portion thereof. When assembled, the piezo-diaphragm 110b then sits on the thinner diameter of the spacer 412 via interference fit and/or an adhesive. Likewise, the spacer 414 may be formed as a step axle with a thinner diameter at a top portion thereof. When assembled, the piezo-diaphragm 110a then sits on the thinner diameter of the spacer 414 via interference fit and/or an adhesive.

Each of the piezo-diaphragms 110a-110c may come with different sizes and mechanical properties, therefore different resonance frequencies. Each of the piezo-diaphragms 110a-110c may generate a signal output and when such signals are combined, the combined output signal provides a wider bandwidth and higher sensitivity than a single piezo diaphragm implementation. As noted above, the post 208 and the extending portion 210 are generally stiff and may not be compressible or flexible as noted in connection with the sensors 200, 200', 200" noted above. In this manner, the post 208 and/or the extending portion 210 function to support or mount the piezo-diaphragms 110a, 110b, 110c inside the housing 152.

Similar to the sensor 150 as discussed in connection with FIG. 3, the sensor 400' also include channels 180a and/or 180b. The channels 180a and/or 180b may reduce or eliminate the pressure differential of the volume of air located on the first side 162 and the second side 164 of the sensor 400'. As noted above, the channel 180a and/or 180b may create ventilation between the volume of air 162 on the first side 172 and the air 164 on the second side 174 and reduce the pressure differential between the air 162 on the first side 172 and the air 164 on second side 174 of the sensor 400'. It is recognized that the number of channels 180 may vary based on the desired criteria of a particular implementation. In general, at least one outer end 115a and/or 115b of the substrate plate 114c and at least one of the walls of the housing 152 define or form the channel 180a and/or 180b. It is recognized that the number of channels 180 formed in the sensor 400' may vary based on the desired criteria of a particular implementation. In general, any of the channels 180 as disclosed herein may ensure that static air pressure is equalized between the two sides 172 and 174 of any piezo-diaphragm 110 at all times.

Figure 16:
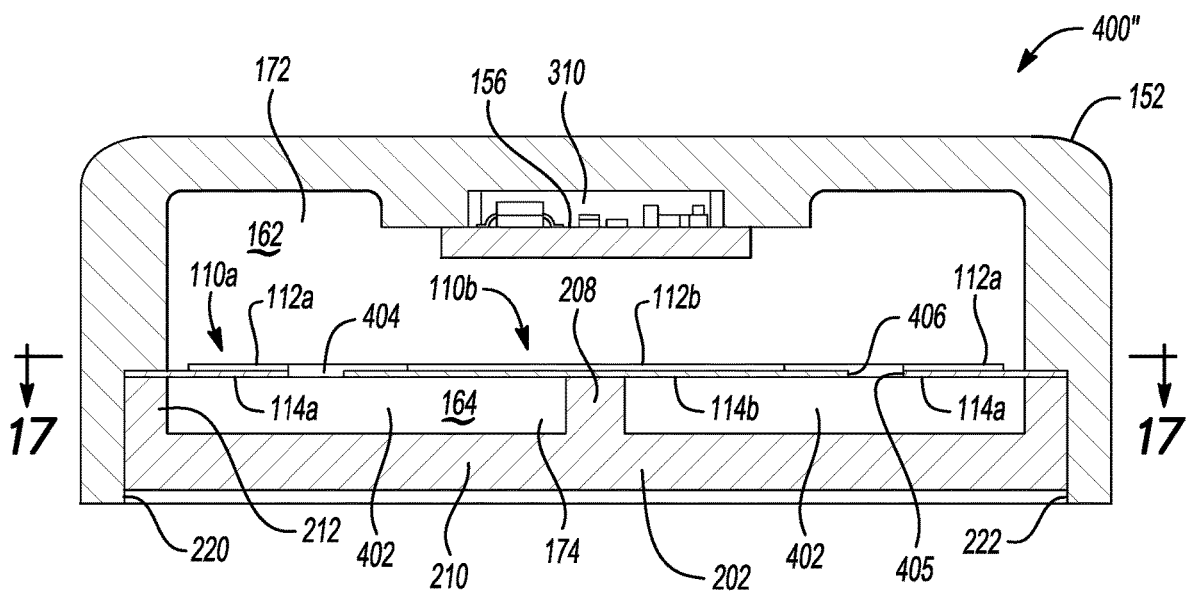
FIG. 16 depicts a cross-sectional view of another multi-stage piezo-diaphragm based sound and vibration sensor in accordance to one embodiment.

FIG. 16 depicts a cross-sectional view of another multi-stage piezo-diaphragm based sound and vibration sensor 400" in accordance to one embodiment. The sensor 400" includes a number of the features disclosed in connection with the multi-stage piezo-diaphragm based sensors 400, 400' and the single piezo-diaphragm based sensors 200, 200', 200", and 200'". The sensor 400" includes a plurality of piezo-diaphragms 110a-110b that are positioned concentrically on the bottom plate 202. A cavity 402 is formed by the bottom plate 202, the post 208, and the piezo-diaphragms 110a-110b. Each of the piezo-diaphragms 110a-110b generates an output signal with a distinct resonance frequency and when such signals are electronically combined, the combined output signal provides the wide bandwidth and high sensitivity.

The housing 152 defines the cavity 310 for receiving the PCBA 156 including the microprocessor and/or the electronics positions thereon. The microprocessor may process the signal and transmit another signal to a controller (e.g., the controller 104). As shown, the piezo-diaphragms 110a and 110b are positioned concentrically on the same plane as one another and supported on the bottom plate 202. To enable the concentric mounting arrangement, the piezo-diaphragm 110b has a disk shape and is positioned on the post 208 of the bottom plate 202 while the piezo-diaphragm 110a has a ring shape and is secured along its edge to a mounting ring 212 on the bottom plate 202. The circular ring shaped piezo-diaphragm 110a and the circular disk shaped piezo-diaphragm 110b are positioned concentrically inside the housing 152 of the sensor 400". An inner diameter 405 of the ring shaped piezo-diaphragm 110a is slightly larger than the outer diameter 406 of the disk shaped piezo-diaphragm 110b, which separate them by a space (or gap) 404 and allow them to vibrate independently. Due primarily to the dramatic differences in their shapes and the resulting mechanical parameters, the piezo-diaphragms 110a and 110b provide distinct resonance frequencies of the desired values.

As shown in FIG. 16, two piezo-diaphragms 110a and 110b are concentrically mounted inside the housing 152. A first disk shaped piezo-diaphragm 110b is mounted on the center post 208 and, for example, a donut (e.g., ring) shaped piezo-diaphragm 110a is mounted along its edge onto the housing 152. The gap 404 forms the air ventilation channel (i.e., channel 180 as noted in above implementations) to reduce the pressure differential between the air 162 on the first side 172 and the air 164 on the second side 174.

Figure 17:
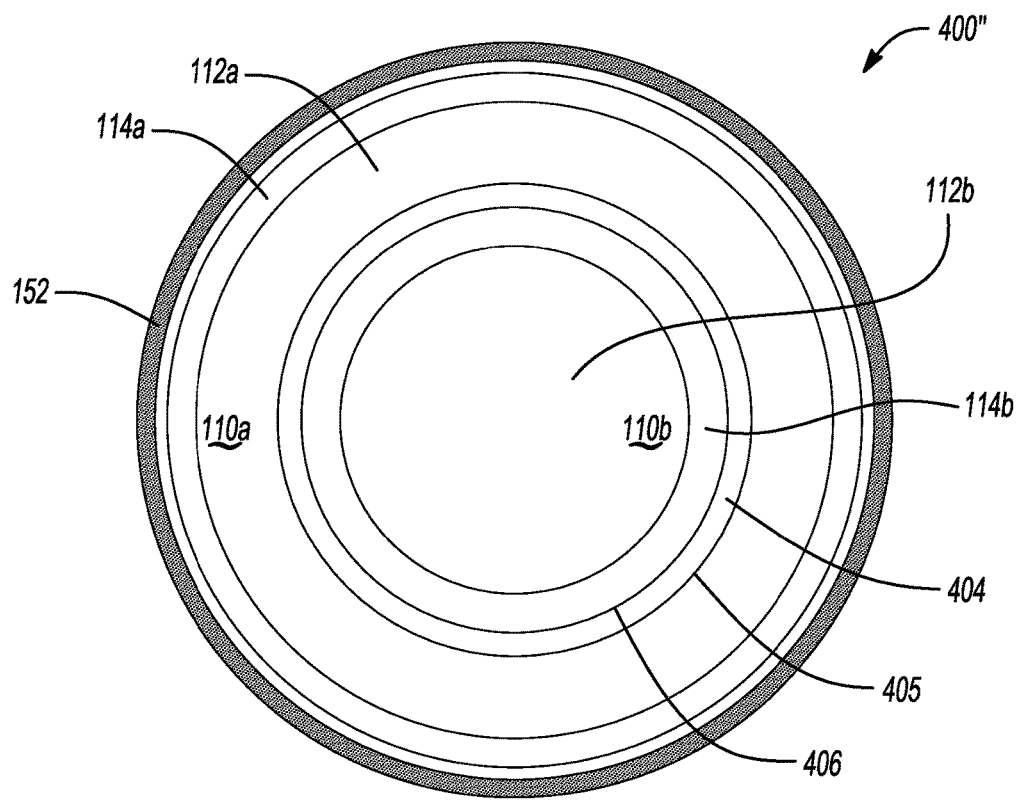
FIG. 17 depicts a top view of the multi-stage piezo-diaphragm based sound and vibration sensor of FIG. 16 in accordance to one embodiment.

FIG. 17 depicts a top view of the multi-stage piezo-diaphragm based sound and vibration sensor 400" of FIG. 16 in accordance to one embodiment. As shown, the piezo-diaphragm 110a includes the ring shaped piezo ceramic disk 112a and the ring shaped metal substrate plate 114a. The piezo-diaphragm 110b includes the circular disk shaped piezo ceramic disk 112b and the circular disk-shaped metal substrate plate 114b). The piezo-diaphragms 110a, 110b are packaged concentrically within the housing 152 which is also concentric (or circular).

Figure 18:
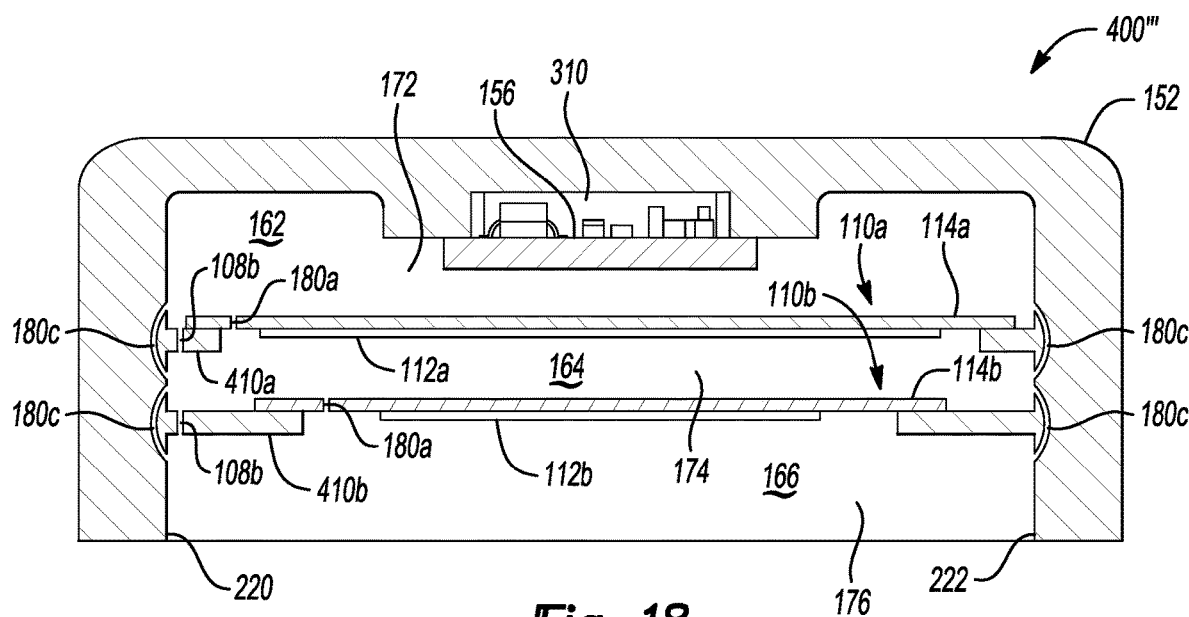
FIG. 18 depicts a cross-sectional view of another multi-stage piezo-diaphragm based sound and vibration sensor in accordance to one embodiment.

FIG. 18 depicts a cross-sectional view of another multi-stage piezo-diaphragm based sound and vibration sensor 400'" in accordance to one embodiment. The sensor 400' includes a number of the features disclosed in connection with the multi-stage piezo-diaphragm based sensors 400, 400', 400" and the single piezo-diaphragm based sensors 200, 200', 200", and 200'". The sensor 400" includes a plurality of piezo-diaphragms 110a-110b. Each of the piezo-diaphragms 110a-110b generates an output signal with a distinct resonance frequency and when such signals are electronically combined, the combined output signal provides the wide bandwidth and high sensitivity.

The housing 152 defines the cavity 310 for receiving the PCBA 156 including the microprocessor and/or the electronics positions thereon. The microprocessor may process the signal and transmit another signal to a controller (e.g., the controller 104). As shown, the overall sizes (e.g., length or diameter) of each of the piezo diaphragms 110a-110b are different from one another. Since the resonance frequency and sensitivity are closely related with the mechanical parameters such as the sizes of each piezo-diaphragm 110a-110b. The differences in sizes of the piezo diaphragms 110a-110b arrange their respective or corresponding resonance frequencies with desired values. Therefore, when the outputs from the plurality of the piezo-diaphragms 110a-110b are electronically combined, the sensor 400'" will have improved bandwidth and sensitivity compared to each of the piezo-diaphragms 110a-110b being used alone.

The housing 152 includes a plurality of flanges 410a-410b that extend inwardly toward the PCBA 156. Each of the flanges 410a-410b is axially spaced apart from one another (or is parallel to one another). The piezo-diaphragm 110a is positioned on the flange 410a. The piezo-diaphragm 110b is positioned on the flange 410b. FIG. 18 illustrates that the bottom plate 202 is not present. However, it is recognized that the bottom plate 202 may be implemented and may be connected to the housing 152 circumferentially at the ends 220 and 222 if necessary to seal the housing. In the event the bottom plate 202 is not required (or provided), then the housing 152 forms a bottom opening thereof.

Similar to FIG. 3, the sensor 400'" includes channels 180a, 180b, and 180c that are defined by the flanges (or ledges) 410a-410b, the housing 152, and the substrate plates 114a-114b, respectively. The sensor 400'" includes the first volume of air 162 positioned on the first side 172, the second volume of air 164 positioned on the second side 172, and a third volume of air 166 positioned on a third side 176 of the sensor 400'". Generally, any one or more of the channels 180a, 180b, and 180c as positioned about the first substate plate 114a and the second substrate plate 114b may reduce the pressure differential of the volume of air 162, 164, and 166 positioned on the first, second, and third sides 172, 174, and 176, respectively.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A sound and vibration sensor comprising:
a housing;
a piezo-diaphragm including a substrate plate positioned in the housing to detect an input signal including audio or vibrations,
wherein the substrate plate and at least one first portion of the housing define a first volume of air positioned on a first side of the sensor,
wherein the substrate plate and at least one second portion of the housing define a second volume of air positioned on a second side of the sensor and the first volume of air and the second volume of air at least providing a differential pressure level on the piezo-diaphragm, and
wherein at least one of the housing and the substrate plate define at least one channel to ventilate the at least one of the first volume or air and the second volume of air to minimize or reduce the differential pressure level on the piezo-diaphragm; and
a flexible support plate to receive the piezo-diaphragm to enable the sensor to exhibit a frequency response with a plurality of resonant frequencies in response to detecting the audio or the vibrations on the input signal,
wherein the flexible support plate includes a mounting post extending therefrom and being configured to receive the piezo-diaphragm to support the piezo-diaphragm in the housing.

2. The sound and vibration sensor of claim 1, wherein at least one wall of the housing defines the at least one channel to ventilate the at least one of the first volume of air and the second volume of air.

3. The sound and vibration sensor of claim 1, wherein the housing includes a ledge to support the substrate plate and the ledge defines the at least one channel to ventilate the at least one of the first volume of air and the second volume of air.

4. The sound and vibration sensor of claim 1, wherein the flexible support plate includes an extending portion that extends from a first end of the housing to a second end of the housing, and wherein the extending portion extends outwardly from the mounting post.

5. The sound and vibration sensor of claim 4, wherein the substrate plate directly receives the piezo-diaphragm thereon, and wherein the mounting post receives the substate plate with the piezo-diaphragm.

6. The sound and vibration sensor of claim 1, wherein the input signal corresponds to an audio input signal in the form of an audio command that is transmitted from an exterior of a vehicle or from an interior of the vehicle.

7. The sound and vibration sensor of claim 1, wherein the substrate plate separates the first volume of air from the second volume of air.

8. A sound and vibration sensor comprising:
a housing;
a piezo-diaphragm including a substrate plate to detect an input signal including audio or vibrations,
wherein the substrate plate and at least one first portion of the housing define a first volume of air positioned on a first side of the sensor,
wherein the substrate plate and at least one second portion of the housing define a second volume of air positioned on a second side of the sensor and the first volume of air and the second volume of air at least providing a differential pressure level on the piezo-diaphragm, and
wherein at least one of the housing and the substrate plate define at least one channel to ventilate the at least one of the first volume or air and the second volume of air to minimize or reduce the differential pressure level on the piezo-diaphragm; and
a flexible support plate to receive the piezo-diaphragm to enable the sensor to exhibit a frequency response with a plurality of resonant frequencies in response to detecting the audio or the vibrations on the input signal,
wherein the flexible support plate includes a mounting post extending therefrom and being configured to receive the piezo-diaphragm to support the piezo-diaphragm in the housing.

9. The sound and vibration sensor of claim 8, wherein at least one wall of the housing defines the at least one channel to ventilate the at least one of the first volume of air and the second volume of air.

10. The sound and vibration sensor of claim 8, wherein the housing includes a ledge to support the substrate plate and the ledge defines the at least one channel to ventilate the at least one of the first volume of air and the second volume of air.

11. The sound and vibration sensor of claim 8, wherein the flexible support plate includes an extending portion that extends from a first end of the housing to a second end of the housing, and wherein the extending portion extends outwardly from the mounting post.

12. The sound and vibration sensor of claim 11, wherein the substrate plate directly receives the piezo-diaphragm thereon, and wherein the mounting post receives the substate plate with the piezo-diaphragm.

13. The sound and vibration sensor of claim 8, wherein the input signal corresponds to an audio input signal in the form of an audio command that is transmitted from an exterior of a vehicle or from an interior of the vehicle.

14. The sound and vibration sensor of claim 8, wherein substrate plate separates the first volume of air from the second volume of air.

15. A sound and vibration sensor comprising:
a housing;
a piezo-diaphragm including a substrate plate to detect an input signal including audio or vibrations,
wherein the substrate plate and at least one first portion of the housing define a first volume of air positioned on a first side of the sensor,
wherein at least the substrate plate defines define a first volume of air positioned on a first side of the sensor and a second volume of air positioned on a second side of the sensor that is opposite to the first side,
wherein the first volume of air and the second volume of air at least providing a differential pressure level on the piezo-diaphragm, and
wherein at least one of the housing and the substrate plate define at least one channel to ventilate the at least one of the first volume or air and the second volume of air to minimize or reduce the differential pressure level on the piezo-diaphragm, and a flexible support plate to receive the piezo-diaphragm to enable the sensor to exhibit a frequency response with a plurality of resonant frequencies in response to detecting the audio or the vibrations on the input signal, wherein the flexible support plate includes a mounting post extending therefrom and being configured to receive the piezo-diaphragm to support the piezo-diaphragm in the housing.

16. The sound and vibration sensor of claim 15, wherein substrate plate separates the first volume of air from the second volume of air.

\* \* \* \* \*